United States Patent [19]

Kaku et al.

[11] Patent Number: 5,270,987
[45] Date of Patent: Dec. 14, 1993

[54] MAGNETO-OPTICAL RECORDING AND REPRODUCING METHOD, MAGNETO-OPTICAL MEMORY APPARATUS AND MAGNETO-OPTICAL RECORDING MEDIUM THEREFOR

[75] Inventors: Toshimitsu Kaku, Sagamihara; Shigeru Nakamura, Tachikawa; Masahiko Takahashi, Hachioji; Toshio Niihara, Sayama; Harukazu Miyamoto, Kodaira; Norio Ohta, Iruma; Takeshi Nakao, Sagamihara; Hirofumi Sukeda, Kokubunji; Masahiro Ojima, Tokyo; Takashi Toyooka, Sayama; Tsuneo Suganuma, Tokorozawa; Fumiyoshi Kirino; Yoshinori Miyamura, both of Tokyo, all of Japan

[73] Assignee: Hitachi, Ltd., Tokyo, Japan
[21] Appl. No.: 509,743
[22] Filed: Apr. 17, 1990

Related U.S. Application Data

[63] Continuation-in-part of Ser. No. 153,094, Feb. 8, 1988, Pat. No. 5,020,041.

[30] Foreign Application Priority Data

| Apr. 19, 1989 [JP] | Japan | 1-097312 |
|---|---|---|
| Aug. 9, 1989 [JP] | Japan | 1-204658 |
| Sep. 20, 1989 [JP] | Japan | 1-241974 |

[51] Int. Cl.$^5$ ............................................ G11B 11/00
[52] U.S. Cl. ...................................... 369/13; 360/59; 360/114
[58] Field of Search ................. 369/13, 14, 120, 111, 369/112; 360/59, 114, 133

[56] References Cited

U.S. PATENT DOCUMENTS

| 3,905,040 | 9/1975 | Otala | 369/13 |
|---|---|---|---|
| 4,404,599 | 9/1983 | Kinjo et al. | 369/139 |
| 4,412,264 | 10/1983 | Imamura et al. | 369/13 |
| 4,466,004 | 8/1984 | Kobayashi et al. | 369/13 |
| 4,477,852 | 10/1984 | Ota et al. | 369/13 |
| 4,544,443 | 10/1985 | Ohta et al. | 369/13 |
| 4,549,287 | 10/1985 | Hatano et al. | 360/114 |
| 4,561,032 | 12/1985 | Matsumoto et al. | 369/13 |
| 4,633,455 | 12/1986 | Hudson | 360/114 |
| 4,660,187 | 4/1987 | Yoshino et al. | 360/59 |
| 4,675,767 | 6/1987 | Osato et al. | 360/114 |
| 4,695,514 | 9/1987 | Takahashi et al. | 428/432 |
| 4,706,232 | 11/1987 | Funada et al. | 369/13 |
| 4,785,438 | 11/1988 | Mizunoe | 369/13 |
| 4,796,241 | 1/1989 | Hayakawa et al. | 369/13 |
| 4,829,505 | 5/1989 | Boyd et al. | 369/120 |
| 4,835,756 | 5/1989 | Kako et al. | 369/111 |
| 4,853,912 | 8/1989 | Akasaka et al. | 369/13 |
| 4,922,454 | 5/1990 | Taki | 369/13 |
| 4,953,150 | 8/1990 | Sonobe | 369/13 |
| 4,965,780 | 10/1990 | Lee et al. | 369/110 X |

FOREIGN PATENT DOCUMENTS

| 0310680 | 4/1988 | European Pat. Off. | |
|---|---|---|---|
| 0309200 | 9/1988 | European Pat. Off. | |
| 0352104 | 1/1990 | European Pat. Off. | 369/13 |
| 0153858 | 7/1986 | Japan | 369/13 |
| 0033750 | 2/1990 | Japan | 369/13 |

Primary Examiner—Eugene R. LaRoche
Assistant Examiner—Christopher R. Glembocki
Attorney, Agent, or Firm—Antonelli, Terry, Stout & Kraus

[57] ABSTRACT

A magnetic field of a polarity corresponding to information to be recorded is applied while a recording spot having a high energy is irradiated to a magneto-optical recording medium to record domains representing the information along a track. The recorded domains are read out by a reproducing spot having a lower energy than the recording spot and a high resolution power along the track. A recording head has an optical system for irradiating the recording spot having the high energy to the magneto-optical recording medium and a magnetic head for applying a magnetic field having a polarity thereof switched in accordance with the information to be recorded, to an irradiation area of the recording spot, a reproducing head has an optical system for irradiating the reproducing spot having the low energy by a laser beam having a wavelength of no larger than 600 nm and a magneto-optical signal detector for detecting a displacement of a polarization plane of a reflected light of the reproducing spot to read out the recording domains. The magneto-optical recording medium is made of a recording film having a multi-layer structure of alternate lamination of metal layers and dielectric layers.

53 Claims, 18 Drawing Sheets

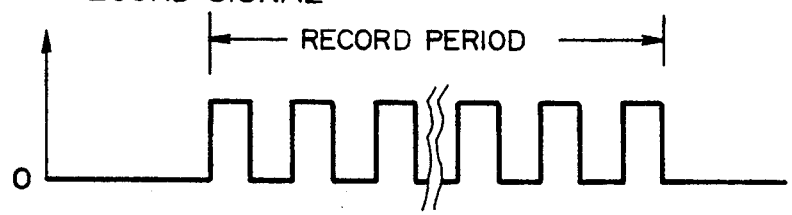
FIG. 2A RECORD SIGNAL
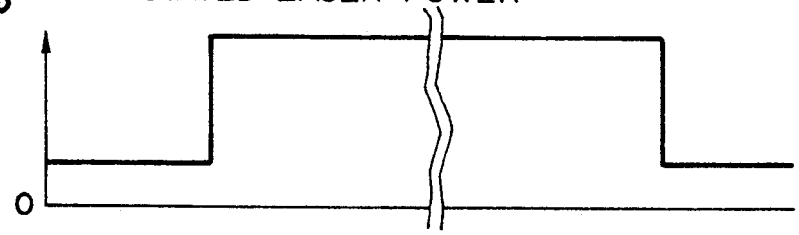
FIG. 2B IRRADIATED LASER POWER
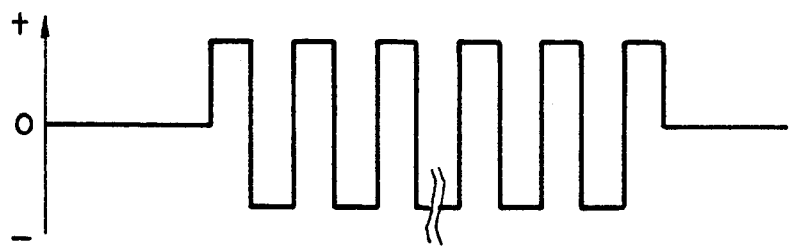
FIG. 2C APPLIED MAGNETIC FIELD
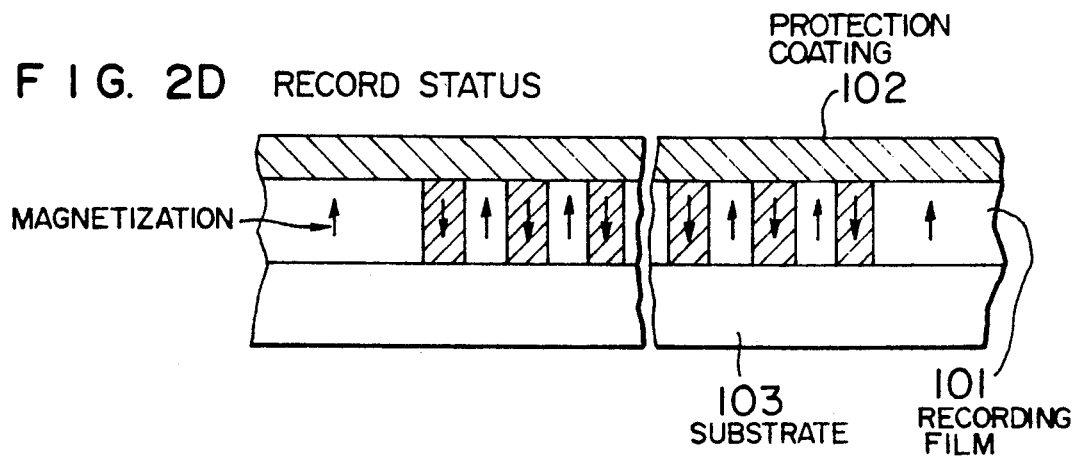
FIG. 2D RECORD STATUS SP1 FOCUS SPOT 1
(WAVELENGTH 420mm)

SP2 FOCUS SPOT 2
(WAVELENGTH 830mm)

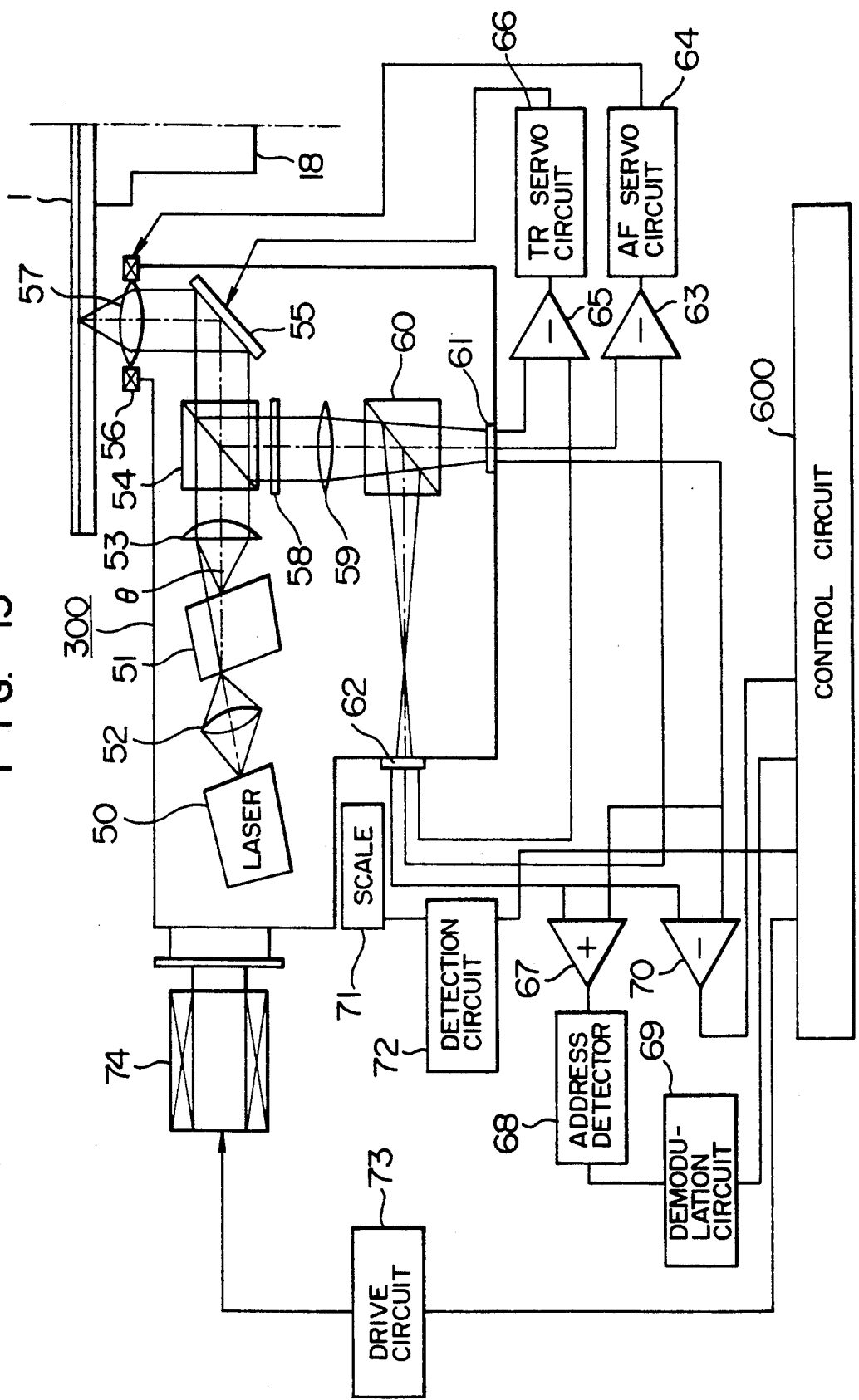

DIFFRACTION LIGHT DIFFERENTIAL TYPE

3-SPOT TYPE

F I G. 19
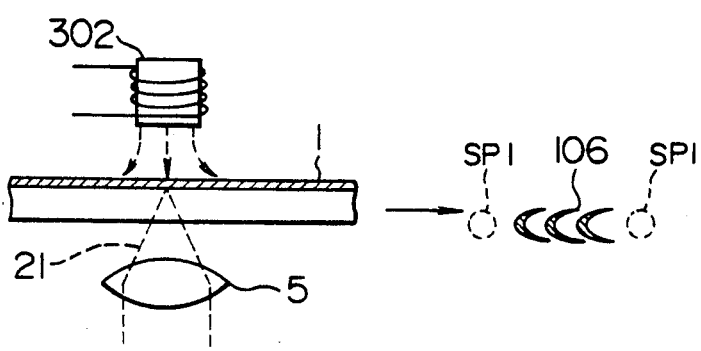
F I G. 20
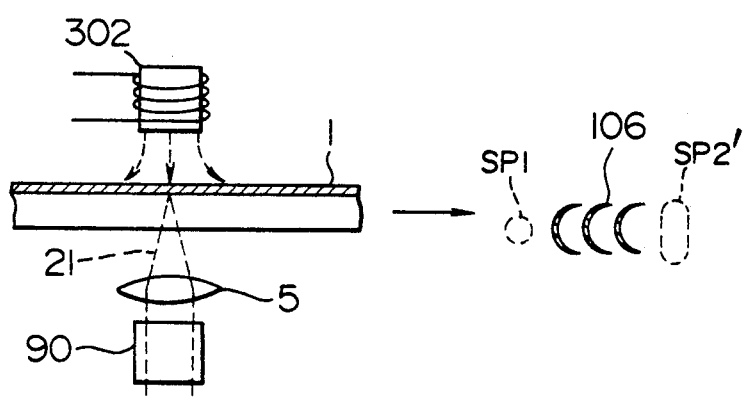
F I G. 21
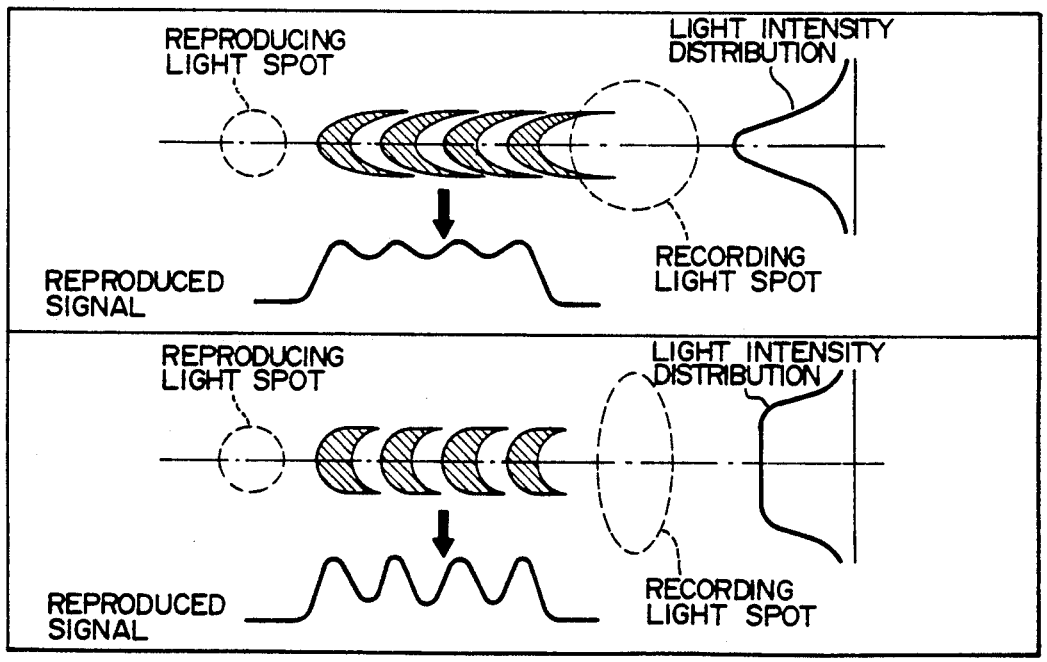

MAGNETO-OPTICAL RECORDING AND REPRODUCING METHOD, MAGNETO-OPTICAL MEMORY APPARATUS AND MAGNETO-OPTICAL RECORDING MEDIUM THEREFOR

This application is a continuation-in-part application of copending U.S. patent application Ser. No. 153,094 filed Feb. 8, 1988, now U.S. Pat. No. 5,020,041, the contents of which are incorporated herein by reference.

BACKGROUND OF THE INVENTION

The present invention relates to magneto-optical recording and reproducing method, magneto-optical memory apparatus and magneto-optical recording medium therefor, and more particularly to magneto-optical recording and reproducing method and magneto-optical memory apparatus for erasing and recording information by a magnetic field modulation method by using a laser beam and an external magnetic field and reproducing the information by using a laser beam to permit overwriting, and magneto-optical recording medium therefor.

Prior art overwritable magneto-optical disk devices include one which uses two light spots as described in IEEE Transaction on Magnetics MAG-20, Vol. 5 p 1013 (1984), and magnetic field modulation recording in which a magnetic field applied to a recording film is modulated with recording information as disclosed in JP-A-51-107121, JP-A-59-215008 and JP-B-60-48806. The present invention particularly relates to the overwritable magneto-optical recording and reproducing method and magneto-optical memory apparatus by the latter magnetic field modulation recording.

The magneto-optical recording includes a light modulation recording system in which a light intensity is changed in which a light intensity is changed in accordance with information to be recorded while an external magnetic field is continuously applied in order to record the information, and a magnetic field modulation recording system in which a polarity of the external magnetic field is changed in accordance with information to be recorded while a laser beam is continuously irradiated in order to record the information. In high density recording (in which a magnetic domain length is equal to or less than 0.5 $\mu$m), a variation of the magnetic domain length of a circular magnetic domain due to the change of light power is large in the light modulation recording system and stable recording is hard to attain. On the other hand, in the magnetic field modulation recording system, the variation of the magnetic domain length of a crescent-shaped magnetic domain is much smaller than that in the light modulation recording system and stable high density recording is attained.

However, in the magnetic field modulation recording system, since the recording and reproducing are effected by a laser beam having a wavelength of 780-830 nm, the recording may be done but the reproduction of the magnetic domains recorded at a high density, with a high S/N ratio is difficult to attain. The S/N ratio decreases because the higher the rotation speed of the disk is, the large is the end portions of the crescent-shaped magnetic domain.

JP-B-62-59375 discloses a magneto-optical recording and reproducing apparatus for recording information by the light modulation recording system, in which a wavelength of a recording laser beam is longer than a wavelength of a reproducing laser beam, at least an objective lens is shared by a recording optical system and a reproducing optical system, and a beam spot size of the recording system is larger than that of the reproducing system.

SUMMARY OF THE INVENTION

In the magnetic field modulation recording system, the recording and reproducing are effected by the laser beam having the wavelength of 780-830 nm. Accordingly, the stable high density recording is attained but the reproduction of the magnetic domains recorded at a high density, with a high S/N ratio is difficult to attain in view of an optical resolution power. Further, the higher the rotation speed of the disk is, that is, the higher a relative speed of a light spot and a recording medium is, the longer are the end portions of the crescent-shaped magnetic domain, as a result, the S/N ratio decreases.

It is an object of the present invention to read, with a high S/N ratio, the information recorded at a high density by the magnetic field modulation recording system, and improve the S/N ratio in high speed recording.

It is most effective to shorten a wavelength of a laser beam used for recording, reproducing or erasing in order to attain the high density. As the wavelength is shortened, a track pitch can be shortened and a bit interval can also be narrowed. Currently, the materials of the magneto-optical recording medium are amorphous alloys of rare earth elements and iron group elements. Among others, TbFeCo is a heart thereof. However, in the amorphous alloy of the rare earth-iron group elements, as the light wavelength becomes shorter, a Kerr rotation angle reduces and a reproduced output reduces. Further, a record magnetic domain formed is very small and a larger Kerr rotation angle is required. When the reproduced output is small, an error is likely to be included and the reliability of information is lowered.

It is another object of the present invention to use a magneto-optical recording medium which produces a large reproduced output even with a short light wavelength, reads out, with a high S/N ratio, magnetic domains recorded at a high density by the magnetic field modulation recording system, by using a reproducing light having a short wavelength so that the reliability is improved.

The magneto-optical recording and reproducing method of the present invention is characterized by applying a magnetic field having a polarity corresponding to the information to be recorded while a high energy recording spot is irradiated to a magneto-optical recording medium to record domains representing the information along a track, and reading out the record domains by a reproducing spot having a lower energy than that of the recording spot and having a high resolution power along the track.

The size D of the light spot focused onto the recording medium is determined by a wavelength $\lambda$ of the light (laser beam) used and a numerical aperture (NA) of a focusing objective lens, that is, $D = \lambda/NA$. In the magneto-optical recording, the light spot having the high energy is irradiated to the recording film to raise a local temperature of the recording film to a Curie point to temporarily diminish the magnetization at the irradiated area so that a domain having a polarity corresponding to the magnetization externally applied to the irradiated area is recorded. As described above, it includes the light modulation recording system and the magnetic field modulation recording system. In the light modulation recording system disclosed in JP-B-62-59375, a circular domain is formed and a minimum domain length (minimum track length of a domain which can be recorded on the recording film) is restricted by the size D of the focusing light spot. Where the continuously recorded domains are reproduced by a spot, a bit-to-bit interval is selected to be substantially equal to a spot diameter taking amplitude attenuation of the reproduced signal into consideration.

Small size domains may be recorded by reducing the recording power of the light spot but the record is instable in view of the recording medium of the recording film and is likely to be affected by disturbance such as defocusing. Further, the reproduced amplitude is significantly attenuated because the spot diameter is larger than the domain diameter. Thus, in the light modulation recording system, the record density is limited by the size of the focusing light spot, that is, the wavelength $\lambda$ of the light (laser beam) in order to attain stable recording and reproducing. Accordingly, it is necessary to shorten the wavelength of the semiconductor laser in order to attain the high record density but a short wavelength laser which produces a high power for recording is not available. Further, in the light modulation recording system, it is difficult to overwrite by one beam.

On the other hand, in the magnetic field modulation system, the light is used only to raise the temperature of the recording film (vertically magnetized film) and the information is recorded by switching the magnetic field of an external magnetic coil. In this case, the size d of the record domain along the track (time axis) is not determined by the size of the focusing light spot, that is, the wavelength $\lambda$ of the light (laser beam) but it is determined by the switching time of the magnetic field. Presently, it is confirmed that domains which are $\frac{1}{2}$ to $\frac{1}{4}$ as large as the wavelength of the recording light source can be recorded.

Thus, when the magneto-optical head capable of recording the information in the magnetic field modulation recording system is used as a recording head, the size of the record domain of the information is determined not by the wavelength of the light source of the recording head but by the switching time of the magnetic field of the magnetic head. Accordingly, the recording at the density which is $\frac{1}{2}$-$\frac{1}{4}$ as large as the wavelength of the recording light source can be attained.

The problem of long end portions of the crescent-shaped domain in the high speed recording may be solved by shaping the recording light spot to oval and making a light intensity distribution pedestal. The oval light spot may be formed by using a diffraction grating or an acoustic-optical effect. Alternatively, a desired shape on a mask pattern may be focused onto the recording medium through a lens. In this method, the shape control of the beam spot is attained without lowering the light intensity.

On the other hand, the recorded information which include domains recorded at a minimum density which is $\frac{1}{2}$-$\frac{1}{4}$ as large as the wavelength of the recording light source cannot be read out by the recording light source. In the present invention, the information is read out by a reproducing spot which has a lower energy than the recording spot and a high resolution power along the track.

In accordance with one feature of the present invention, the optical resolution power in reading out the information may be attained by making the wavelength of the reading light shorter than the wavelength of the recording light, particularly less than 600 nm. By making the wavelength of the reading light shorter than the wavelength of the recording light, the diameter of the reading light spot can be smaller than that of the recording light spot. In this case, it is preferable to read out the information by the light having the wavelength of less than 600 nm. It is also preferable that the recording wavelength is more than 600 nm, particularly more than 800 nm, and the reading wavelength is less than 600 nm.

In accordance with another feature of the present invention, it is preferable that the shape of the recording and/or reading light spot is oval. The oval light spot may be formed by using a diffraction grating or an acoustic-optical effect. The shape of the recording and/or reading light spot may be controlled by passing the light through a pattern mask having a desired shape and focusing the shape of the pattern mask onto a desired point through a lens. A mask patterned on a glass substrate may be used as the pattern mask to control the shape of the spot.

As described above, in order to improve the record density, it is effective to shorten the wavelength of the laser beam used for recording, reproducing or erasing. In this case, a possible problem is a characteristic of a magneto-optical recording film. When high density recording is effected by the magnetic field modulation recording system, the record domain size is small, and in order to read it out without error, the Kerr rotation angle must be no less than that of the presently available disk. A related prior art is disclosed in U.S. Pat. No. 4,695,514.

The amorphous alloys of rare earth element and iron group element have been mainly used in the prior art, and among others, TbFeCo is best. However, with this material, as the wavelength of the reproducing light becomes shorter, the Kerr rotation angle becomes smaller. Thus, it is difficult to reproduce without error. For further high density recording, it is necessary to reduce the size of the record domain and a large Kerr rotation angle is necessary at the wavelength of the light used in order to assure a sufficient S/N ratio.

In accordance with other feature of the present invention, the magneto-optical recording film has alternately laminated layers of one element selected from Pt, Pd and Au, one element selected from Fe and Co, and a dielectric material of inorganic compound.

A recording film which matches to the wavelength of the laser beam used may be obtained by controlling the film thicknesses of the respective layers. Namely, the magneto-optical effect may be maximized to attain a maximum S/N ratio at the given wavelength. The recording film is the alternately laminated films of metal films and dielectric films. The accumulated metal film thickness is critical. Total film thickness is preferably less than 50 nm. If it is thicker than 50 nm, light absorption increases and both wavelength characteristic and disk characteristic are spoiled.

As an alternative method for improving the wavelength characteristic and disk characteristic, a refractive index of the dielectric material film of the inorganic compound may be controlled instead of controlling the film thickness. The dielectric materials of the inorganic compound used are metal oxide, nitride, fluoride or calcogen compound. Specifically, it is a compound which primarily consists of at least one selected from SiNx, SiOx, AlNx, ZnS, AlF$_3$, TiO$_2$, BN, Al$_2$O$_3$, CrOx and Ta$_2$O$_5$.

The dielectric materials are not limited to those but any materials which are transparent to the wavelength of the laser beam used may be used.

A problem encountered when such a multi-layer film is used is diffusion between the layers. The diffusion is likely to occur particularly between the metal layers. In order to prevent the diffusion, two methods were considered. In one method, one or more selected from a group consisting of Pt, Pd, Au and Rh and one or more selected from a group consisting of Fe and Co are alloyed, and the alloy layers and the dielectric material layers are alternately laminated.

In a second method, the disk is constructed as a heat diffusion type. Specifically, a metal layer having a high reflection coefficient and a high thermal conductivity such as Al, Au, Ag, Ca, Pt, Pd or Rh is arranged on the opposite side to the light input side and the heat is diffused through this layer to control a temperature distribution of the record film. In this manner, the diffusion of elements between the layers, particularly between the metal layers can be suppressed. As a result, the disk characteristic, particularly, a reproduced output is not lowered even after a number of times of rewriting. This effect is also effective when the first method is combined. By using the heat diffusion structure, the structure relief of the record film can be suppressed.

In order to control the thermal diffusion coefficient by the metal layers provided for the thermal diffusion, one selected from Al, Au, Pt, Pd, Ag, Cu and Rh and a metal other than mother metal such as Al may be used. In this case, the thermal conductivity of the metal layer for the thermal diffusion may be arbitrarily selected by adding at least one metal selected from Au, Pt, Pd, Ag, Cu and Rh, or at least one metal element selected from Ti, Ta, Nb, Cr and Ni. In this manner, the recording sensitivity may be controlled. The addition of Ti, Ta, Nb, Cr or Ni is effective not only to control the thermal conductivity but also to facilitate the formation of the passive coating. As a result, the reliability of the disk is further improved.

As an application of the recording medium of the present invention, an information recording medium layer having a multi-layer structure is formed on a substrate having a guide groove, a metal reflection film is then formed, and an information recording medium layer having a multi-layer structure is further formed. Finally, the substrates are laminated to form a disk having dual recording surfaces. In this manner, the dual recording surface disk can be manufactured in a simple manner and a manufacturing cost is reduced.

BRIEF DESCRIPTION OF THE DRAWINGS

FIGS. 2A to 2D illustrate information recording operation of the present invention;

FIG. 15 illustrates a reproducing optical head of FIG. 13;

FIGS. 19 and 20 show other embodiments of the magneto-optical recording and reproducing method by the magnetic field modulation in accordance with the present invention;

FIG. 21 shows a relation between a light spot shape and a record domain shape;

DESCRIPTION OF THE PREFERRED EMBODIMENTS

Figure 1:
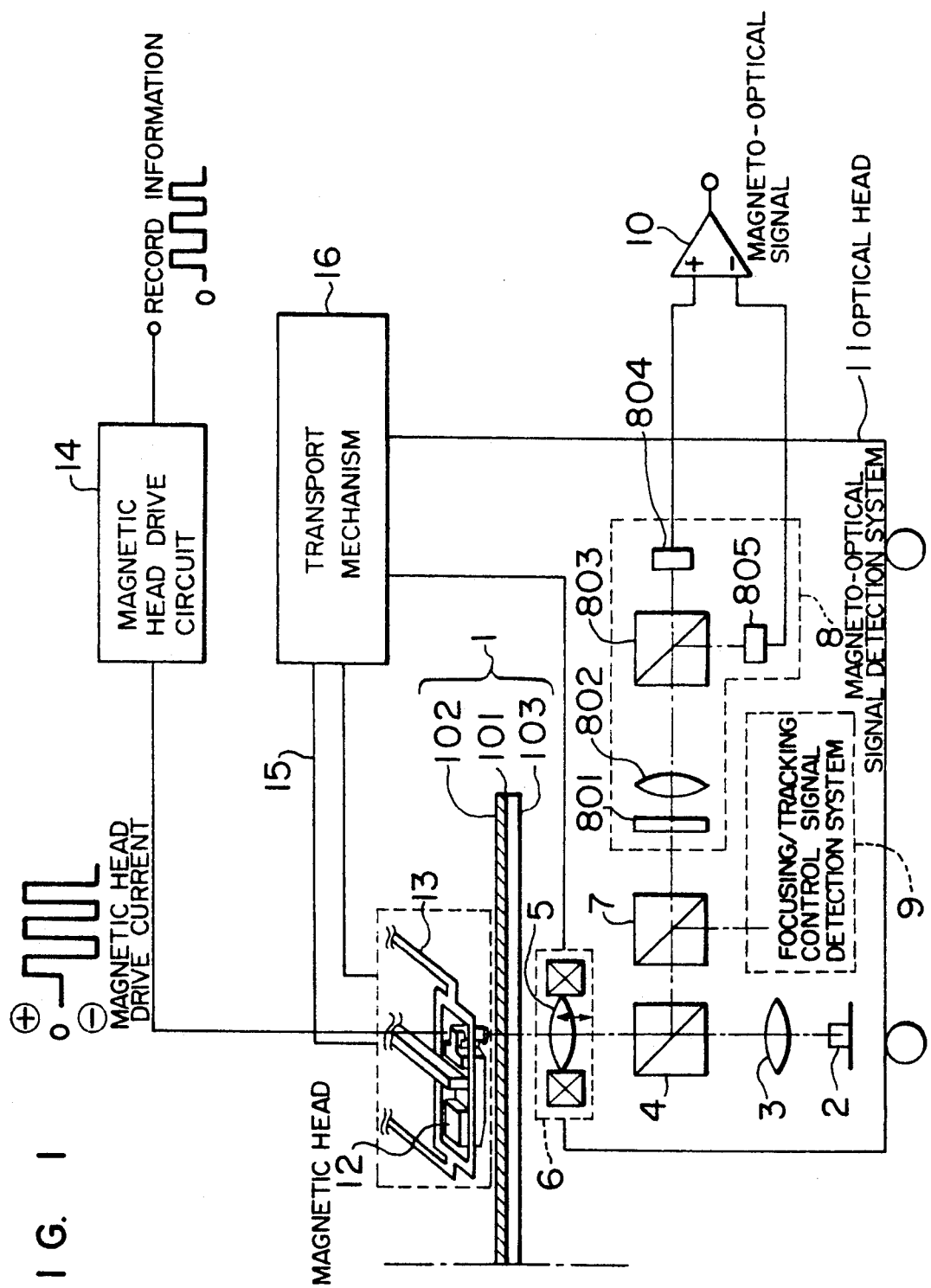
FIG. 1 shows a configuration of a magneto-optical disk apparatus which uses a magnetic field modulation recording system in accordance with the present invention.

Prior to the description of the embodiments of the present invention, the magnetic field modulation recording is first explained with reference to FIG. 1. Numeral 1 denotes a magneto-optical disk which is a rotating recording medium and has a magneto-optical recording medium 101 having a magneto-optical effect and a protection layer 102 formed on a disk-shaped transparent substrate 103. The magneto-optical disk is rotated by a rotation mechanism such as a rotary motor. A light emitted from a light source which is a semiconductor laser 2 is collimated by a collimator lens 3 and directed to a focusing lens 5 through a beam splitter 4. The light beam focused by the lens 5 is directed to the substrate 103 of the disk to form a fine spot of approximately 1 μm in diameter on the recording film 101. The focusing lens 5 is mounted on an actuator 6 such that it follows the fluctuation of the disk 1 to always maintain the focus point on the recording film, and follows the eccentricity of the information recording track on the disk to always bring the spot onto a desired track. A light reflected by the disk 1 passes through the focusing lens 5, is reflected by a beam splitter 4, and directed to a magneto-optical signal detecting optical system 8 and a light point control signal detecting optical system 9 for detecting defocusing and off-track, by a beam splitter 7.

An arrangement of the magneto-optical signal detection system 8 is shown. It is of differential signal detection system which uses a λ/2 plate 801 and a polarization beam splitter 803. A light applied to the magneto-optical signal detecting optical system 8 passes through the λ/2 plate 801 and the lens 802, and separated into polarization components S and P by the polarization beam splitter 803. The polarization components are detected by photo-detectors 804 and 805, respectively, and converted to electrical signals, which are differentiated by a differential amplifier 10, which is turn produces a magneto-optical signal.

A floating magnetic head 12 is arranged on the recording film side which is on the opposite side to the optical head 11 with respect to the disk 1. In FIG. 1, for illustration purpose, the magnetic head is shown in a 90°-rotated position in the disk plane from the actual position and shown as an enlarged bird-eye view. The floating magnetic head 12 comprises a coil for applying a magnetic field to the recording film and a slider for floating the head assembly, and it floats by an air pressure created by the disk rotation while the disk rotates. Since a floating height is essentially constant, the magnetic head 12 follows the fluctuation of the disk 1 and the spacing between the magnetic head 12 and the disk 1 is kept essentially constant during the operation. The floating height is larger than 1 $\mu$m (preferably larger than 2 $\mu$m). With such a floating height, a head crash by dust, which is a problem encountered in a magnetic disk, does not take place and the apparatus may be used and the medium may be removable in atmosphere.

The magnetic head 12 is forced against the disk 1 by a support spring 13 with a load of 5-10 grams. Either a contact start/spot (CSS) method in which the magnetic head constants to the disk when the disk starts and stops rotation, or a method in which the magnetic disk is separated from the disk until a disk rotation speed reaches a predetermined speed may be used. Whichever method may be used, a mechanism 16 for vertically moving the magnetic head 12 is required when the disk 1 is exchanged.

The floating magnetic head 12 is integrally coupled to the optical head 11 by a support arm 15 so that it moves with the optical head 11 and the distance between both heads is kept constant. The magnetic head is arranged exactly above the light spot on the disk. It is not necessary to integrally couple both heads, but where they are not integrally coupled, means for keeping the distance between the heads constant when the record position is moved radially of the disk and magnetic head move means for moving the magnetic head to a position exactly above the light spot are required.

The optical head 11 is moved radially of the disk by a linear motor or a stepping motor.

FIGS. 2A to 2D illustrate an information recording method. In order to record information, the semiconductor laser 2 is activated to emit a high power continuous light as shown in FIG. 2B to heat the magneto-optical recording film 101 on the disk to approximately Curie temperature so that a coercive force at the irradiated area is reduced. The magnetic head 12 is driven by a magnetic head drive circuit 14 so that a modulation magnetic field (FIG. 2C) inverted according to the information to be recorded (FIG. 2A) is applied to the magneto-optical recording film 101 to record the information. A record status is shown in FIG. 2D. Where an applied magnetic field intensity is to be varied in order to keep a record condition constant in spite of variation of rotation speed of the disk as to its inner or outer periphery or laser output, an intensity modulation is used or a D.C. bias component is added to the magnetic field, in addition to the polarity inversion. When new information is recorded on an already-recorded area, the old information does not remain and the old information can be erased by overwriting.

An embodiment of the floating magnetic head 12 and the disk 1, which are principal components is explained in detail. The magnetic head 12 is a floating magnetic head which has a large floating height at a low linear speed and a wide effective magnetic field area. To avoid the head crash by dust, the floating height should be more than 1 $\mu$m and preferably more than 2 $\mu$m, and from a standpoint of alignment of the light spot and the magnetic head, the effective magnetic field area of the head core is 50 $\mu$m × 50 $\mu$m to 1 mm × 1 mm and preferably 50 $\mu$m × 50 $\mu$m to 0.2 mm × 0.5 mm.

Figure 3A:
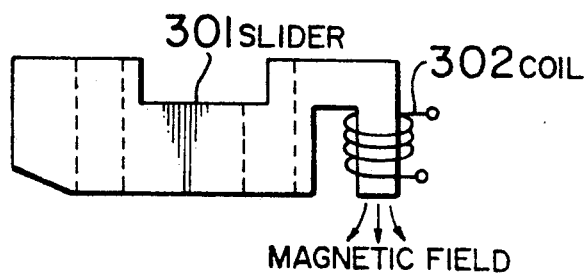
FIG. 3 shows a structure of a magnetic head used in the present invention.
Figure 3B:
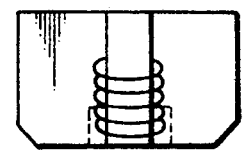
Figure 3C:
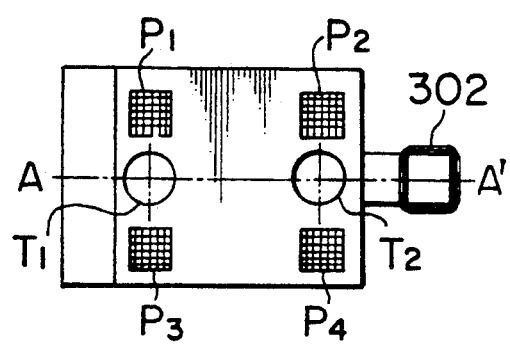
Figure 3E:
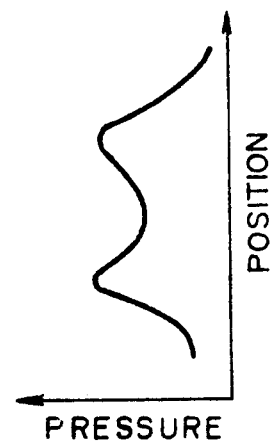
Figure 3D:
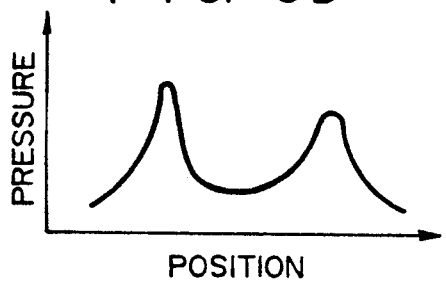
Figure 4A:
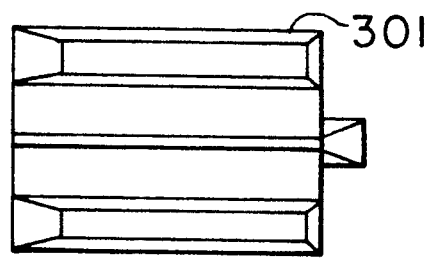
FIG. 4 shows a structure of a prior art magnetic head.
Figure 4B:
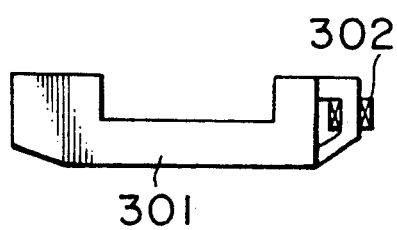
Figure 4C:
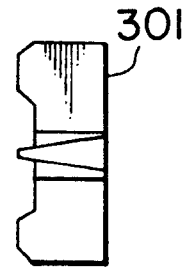
Figure 5:
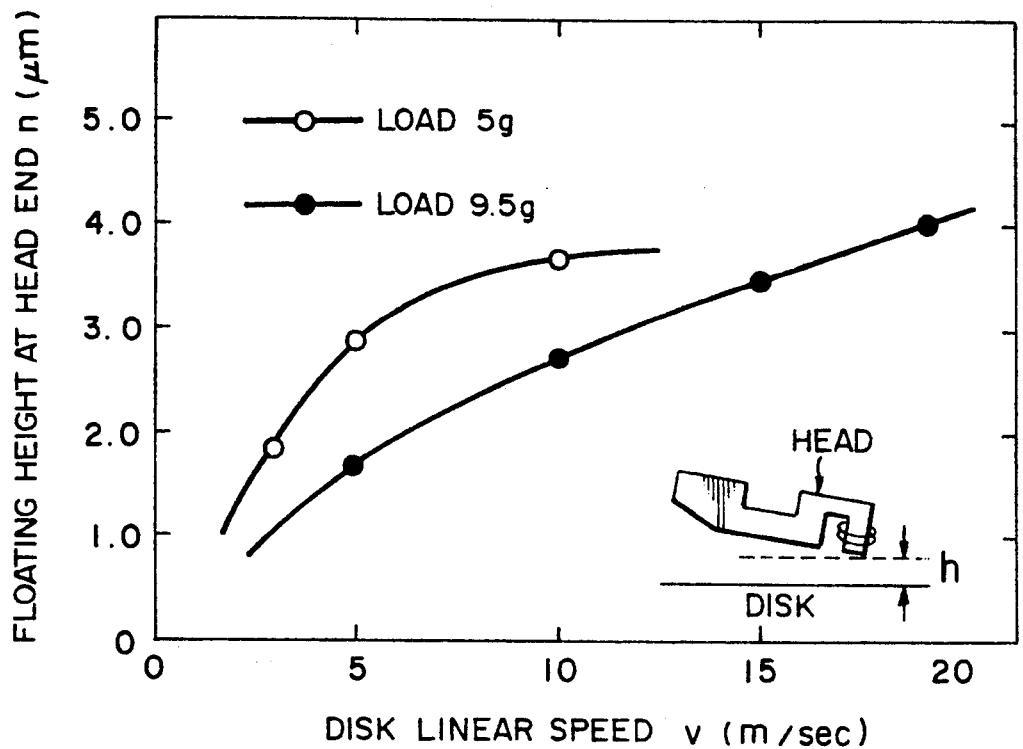
FIG. 5 shows a floating characteristic of a floating magnetic head used in the present invention.
Figure 6A:
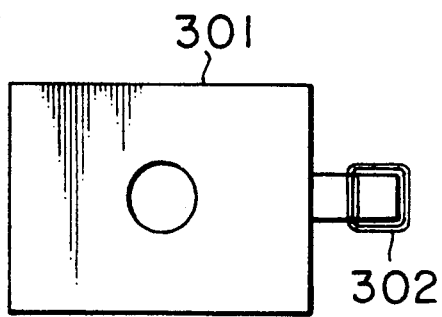
FIGS. 6A, 6B and 7 show other examples of magnetic head used in the present invention.
Figure 6B:
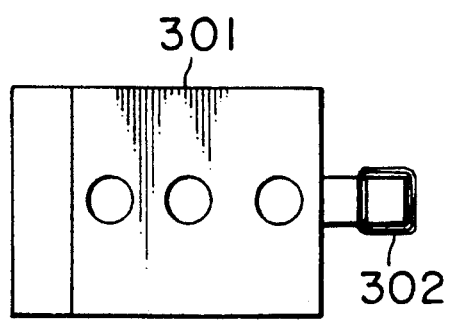

FIGS. 3A to 3E show an embodiment of the floating magnetic head used in the present invention. FIG. 3C shows a slider surface an entire surface which faces the disk is the slider surface, and two essentially circular through-holes $T_1$ and $T_2$ are formed on a center axis AA' of the slider 301 along a direction of travel of the disk. Thus, a slider surface area which contributes to floating is larger than that of a magnetic head shown in FIGS. 4A to 4C and hence the floating height is larger. Air pressure distributions for floating are shown in FIGS. 3D and 3E. Thus, the slider is supported at four points $P_1$–$P_4$ and it floats stably against pitching or rolling. The through-holes $T_1$ and $T_2$ may be essentially circular recesses. The depth of the recesses is determined to assure the air pressure distributions shown in FIGS. 3D and 3E. With such a slider, where an outer dimension of the slide surface is 3 mm × 4 mm, a diameter of the holes $T_1$ and $T_2$ is 0.6 mm and a load is 5 grams, the floating height of 2 $\mu$m is attained at a disk linear speed of 3 m/sec, as shown in FIG. 5. While two circular through-holes or recesses are shown in FIG. 3C, one or three such holes or recesses may be formed as shown in FIGS. 6A and 6B. The shape of the holes or recesses need not be circular but it may be oval or rectangular.

A magnetic field to the recording film is applied by a coil 302 mounted at trailing edge of the slider. A core of the coil is a magnetic material such as Mn-Zn ferrite, and it may be either integral with the slider or the core and the coil may be separately fabricated and coupled to the slider. In the latter case, the slider need not be a magnetic material such as Mn-Zn ferrite but it may be a non-magnetic material such as ceramic.

Where the magnetic material is used as the slider material, a leakage magnetic field of an actuator 6 concentrates to the slide and a net magnetic field intensity applied to the recording film is reduced or the magnetic head may vibrate by mutual action of the magnetic field generated in the magnetic core 302 and the leakage magnetic field. This problem is prevented when the non-magnetic slider is used.

Figure 7A:
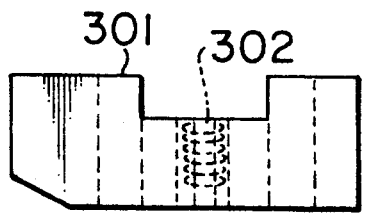
Figure 7B:
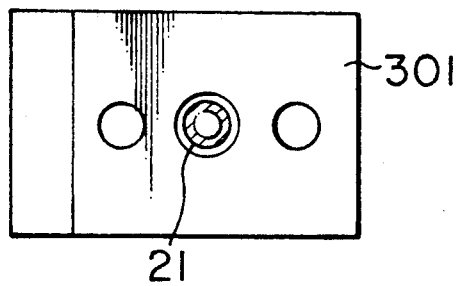
Figure 7C:
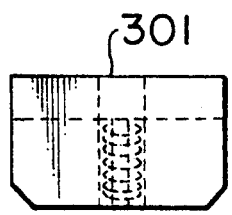

The magnetic field application position need not be at the trailing edge of the slider but it may be in the slider as shown in FIGS. 7A to 7C. It is effective to the non-magnetic ceramic for the slider 301 and a magnetic material only for the coil core 302, or to use a hollow coil. In the latter case, a total inductance of the magnetic head can be reduced and a frequency response to the magnetic head is improved, as will be explained later.

The effective magnetic field area at the end of the coil is determined by (i) alignment precision of the magnetic head (ii) eccentricity of the disk and (iii) frequency response of the magnetic head. From the standpoint of (i) and (ii), a large area is required, but the frequency response of (iii) is deteriorated because the inductance increases. For example, 0.2 mm circumferential ×0.5 mm radial to 0.1 mm circumferential×0.1 mm radial is preferable. In the former case, a record frequency may be 3-5 MHz, and in the latter case, it may be 5-10 MHz.

In the former case, the radial length is larger than the circumferential length so that the light spot does not deviate from the effective magnetic field area even if it moves radially by the eccentricity of the disk. As shown in FIG. 1, the floating magnetic head 12 is fixed to the optical head 11 by the support arm 15 and is moved radially of the disk with the optical head. If a mechanism to follow the eccentricity of the disk is provided in the magnetic head 12, the magnetic field area may be reduced. In this case, however, a position control mechanism for the magnetic head is required in addition to that for the optical head and the apparatus is complex and expensive. In the present embodiment, in order to simplify and reduce cost of the apparatus, the effective magnetic field area has a larger radial length than the circumferential length. Where the optical head is incrementarily moved, by, for example, a stepping motor, the radial movement of the focusing spot is larger than the disk eccentricity and hence the radial length of the effective magnetic field area should be larger than the disk eccentricity. In the magnetic disk or floppy disk, the magnetic field area of the magnetic head corresponds to the record track width, but in the magnetic head used for the magneto-optical disk to the present embodiment, the magnetic field area is 100-200 times as wide as the record track width by the reason described above.

Figure 8:
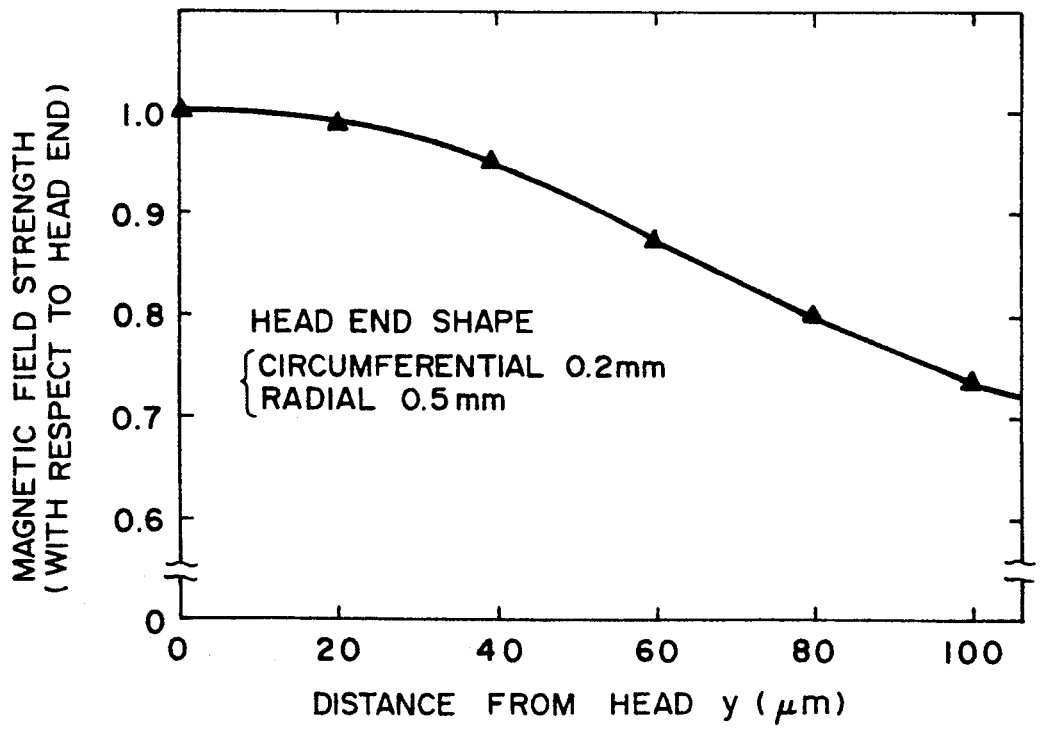
FIG. 8 shows an intensity distribution of magnetic field generated by the magnetic head used in the present invention.

The magnetic field area of the magnetic head used in the present invention is 50-100 times as wide as that of the magnetic head for the magnetic disk. As a result, a ratio of reduction of a vertical component of the magnetic field to a distance from the head is much smaller than that of the head for the magnetic disk. For example, for a magnetic head having a magnetic field area of 0.5 mm×0.2 mm, the reduction of the vertical component of the magnetic field at a position spaced from the edge of the head by 20 μm is 2-3%, as shown in FIG. 8.

Where the magnetic field area is wide, the reduction of the magnetic field strength at a position spaced from the surface of the magnetic head by several tens μm may be smaller than that shown in FIG. 8, but the frequency characteristic is deteriorated. In order to achieve the recording frequency of several MHz, the magnetic field area is preferably smaller than 0.5 mm×0.2 mm and the distance between the magneto-optical recording film and the magnetic head is preferably less than 30 μm. These are important factors in designing a durable disk structure.

Figure 9:
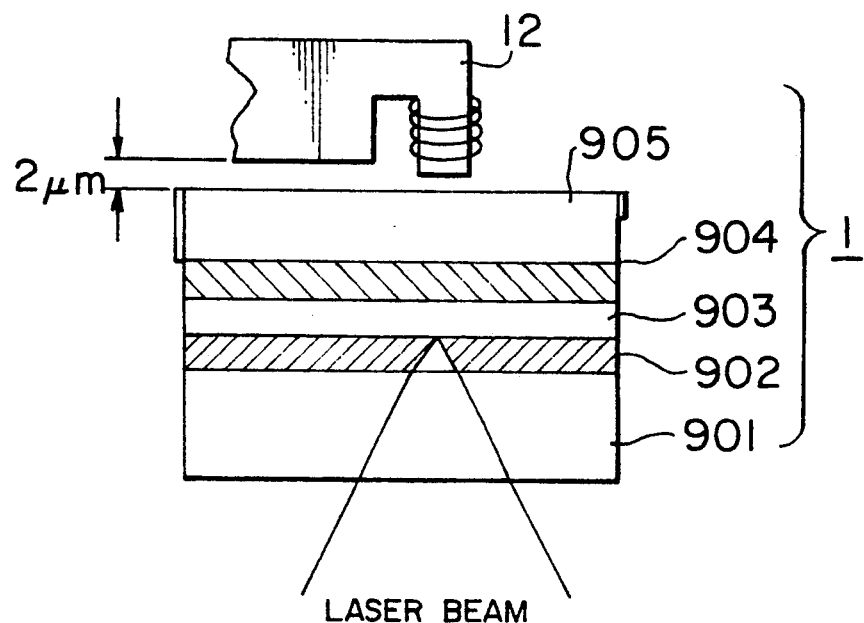
FIG. 9 shows a sectional view of a structure of a magneto-optical disk.

FIG. 9 shows an embodiment of the disk 1. It is a single-side recording disk, and a light is irradiated to a substrate 901 and a magnetic field is applied to a recording film 903. The substrate 901 is a glass or plastic plate having a thickness of approximately 1.2 mm. An enhancement film 902 ($Si_3N_4$ or SiO film having a thickness of approximately 1000 Å) for increasing a Kerr rotation angle is formed on one side of a magneto-optical recording layer 903 (TbFeCO film having a thickness of approximately 1000 Å), and a protection layer 904 ($Si_3N_4$ or SiO layer having a thickness of approximately 2000 Å) for enhancing corrosion resistance and oxidization resistance properties is formed on the other side. A protection coating 905 for enhancing durability to the magnetic head is formed on the protection coating 904 to a thickness of 1-20 μm, and preferably 5-10 μm. Thus, the distance between the recording film 903 and the magnetic head 12 is approximately 10-20 μm. With such a distance, the magnetic field intensity is not reduced as shown in FIG. 8.

The protection coating 905 may be an ultraviolet curing resin. A filler such as $Al_2O_3$ or lubricant may be mixed in the ultraviolet curing resin. The result of pass test reveals that more than one million passes had vertually no influence on write/read characteristics. Furthermore, a pin-on-disk test also revealed that more than one million passes made little damage to the protection layer. In the magneto-optical disk, the record, reproduce and erase characteristics are not affected so long as a defect or break does not reach the recording film. Accordingly, the protection coating may be thick as described above so that the disk durability and the environmental resistance are enhanced and the reliability of the apparatus is improved.

The size D of the light spot focused onto the recording medium is determined by the wavelength λ of the light (semiconductor laser 2) used and the numerical aperture (NA) of the objective lens 5, that is, D=λ/NA. In the magnetic modulation recording of the present invention, the size of the domain (domain length along the track) d recorded on the recording medium is not determined by the wavelength λ of the recording light source and the numerical aperture NA of the focusing lens as it is in a write-after type optical disk or a magneto-optical disk of the light modulation recording system, but it is determined by the switching time of the magnetic field generated by the magnetic head 12. Accordingly, a domain having a minimum domain length along the track of ¼-⅓ of the wavelength λ of the recording light source can be stably recorded. For example, when a semiconductor laser having a high output power (higher than approximately 5 mW) and a wavelength of 830 nm is used as the recording light source, a domain having a minimum domain length of 0.2 μm-0.5 μm can be recorded. However, the domain having such a small domain length cannot be read out by the spot of the recording semiconductor laser (wavelength 830 nm).

Figure 10:
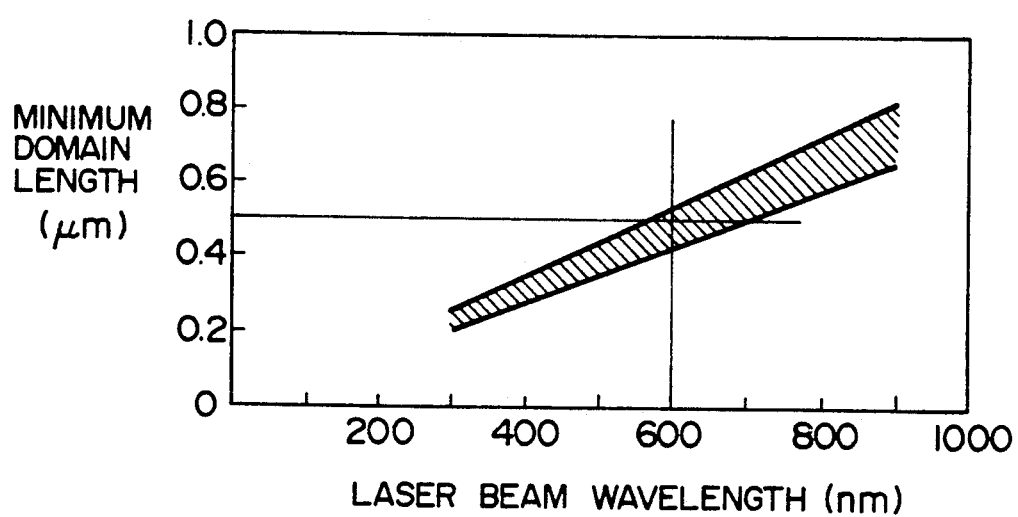
FIG. 10 shows a wavelength depending of a minimum domain length which is detectable by edge detection.

The resolution power of the reproducing spot is now explained. A hatched area in FIG. 10 shows a minimum domain length (domain length along the disk rotation) which permits stable reproduction without edge shift (shift of edge positions between recording and reproducing) when the light spot is focused onto the magneto-optical disk 1 by the objective lens 5 having the numerical aperture of 0.55. As seen from FIG. 10, when the light spot of the recording semiconductor laser having the wavelength of 830 nm is used, the limit of the resolution power is the domain having the minimum domain length of 0.68–0.76 μm, and it is not possible to read out the domain smaller than 0.5 μm. Since the diameter of the light spot is proportional to the laser wavelength λ as described above, the magnetic domain having the domain length of less than 0.5 μm can be read with a high S/N ratio if the wavelength shorter than 600 nm is used.

One embodiment of the magneto-optical recording and reproducing method of the present invention is now explained with reference to FIG. 11. In the present embodiment, a recording light 20 having a wavelength of 830 nm and a reproducing light 21 having a wavelength of 420 nm are simultaneously irradiated to a rotating magneto-optical disk 1 through a focusing lens 5 of an optical head to form a recording spot SP2 and a reproducing spot SP1 on a recording film. Auto-focusing and tracking are conducted by the recording light 20 of 830 nm. An external magnetic field source 302 is located at the opposite side of the disk 1 to the optical head. The intensity of the external magnetic field is modulated such that the recording light 20 of 830 nm is of high energy required to form the domain in the record mode and the reproducing light 21 of 420 nm is of low energy required to read out the information in order to record a crescent-shaped domain 106. In the read mode, the recording light 20 of 830 nm is of low energy required for auto-focusing and tracking, and the information is read out by the reproducing light 21 of 420 nm. The diameter of the circular light spot SP1 by the reproducing light 21 of 420 nm is approximately one half of the diameter of the circular light spot SP2 by the recording light 20 of 830 nm. The CN (Carrier to Noise) ratio when the information is read by the reproducing light of 420 nm is approximately 5 dB larger than the CN ratio when the information is read by an optical head with the reading light 20 of 830 nm. It has been confirmed that the SN ratio is improved by shortening the wavelength of the reading light than the wavelength of the recording light.

Figure 11:
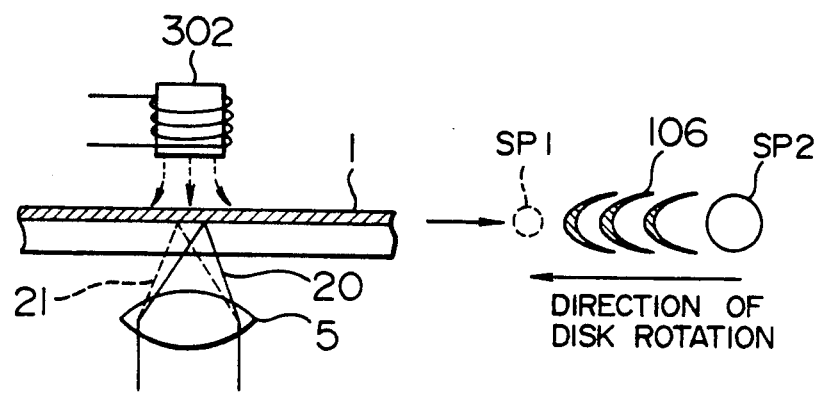
FIG. 11 illustrates one embodiment of a magneto-optical recording and reproducing method by the magnetic field modulation in accordance with the present invention.
Figure 12A:
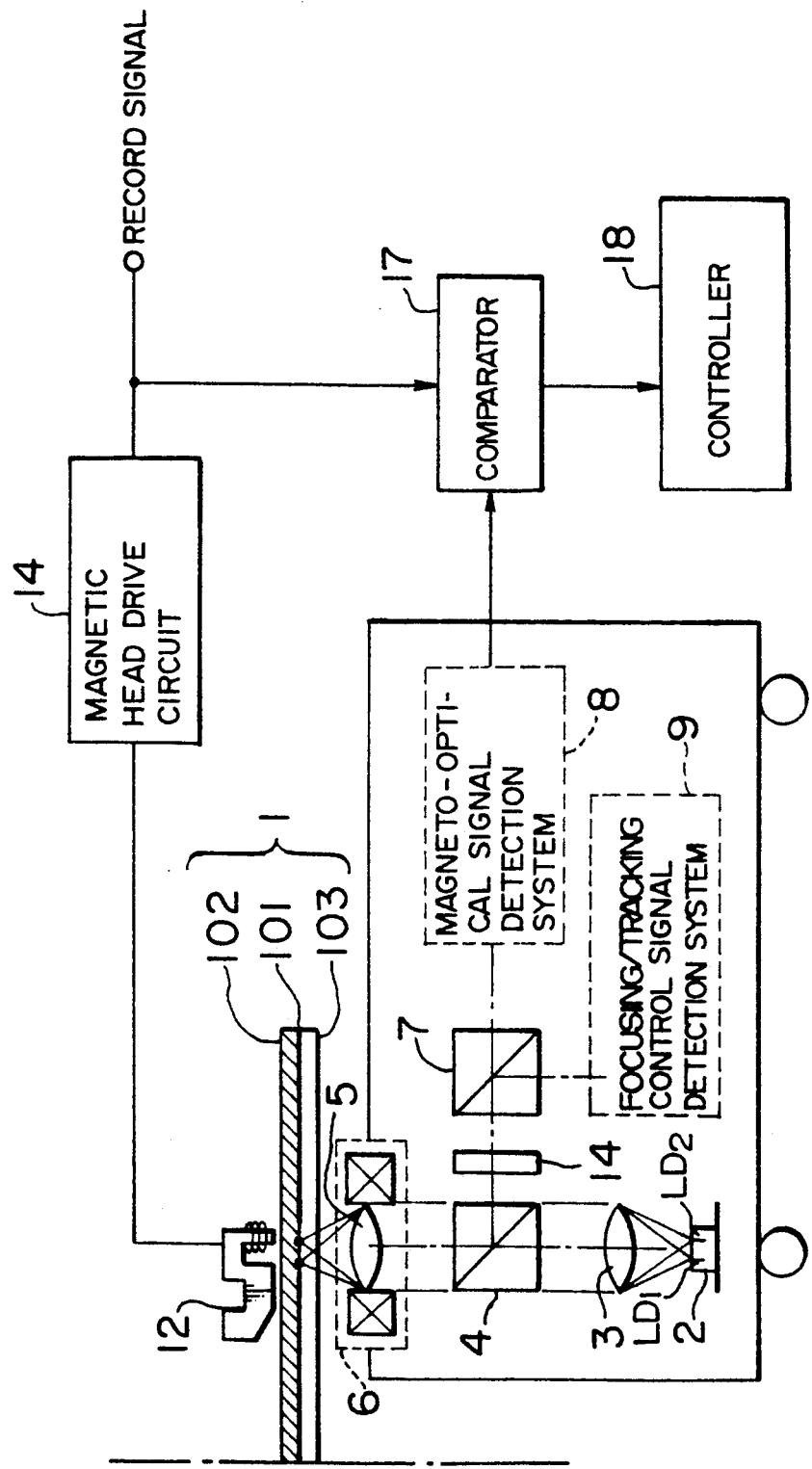
FIGS. 12A and 12B show a configuration of a magneto-optical disk apparatus used to implement the method of FIG. 11.
Figure 12B:
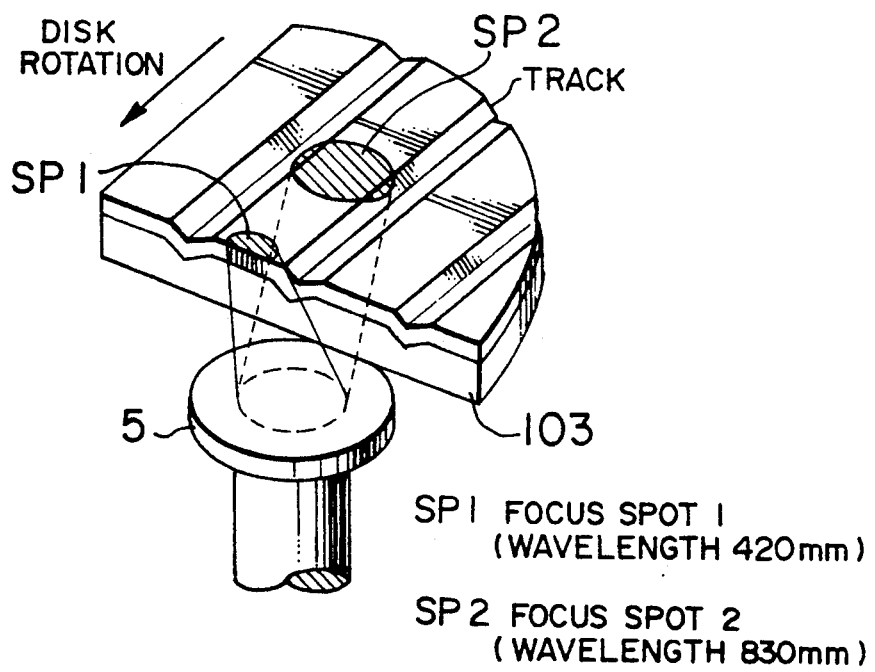

FIG. 12A shows an example of the magneto-optical disk apparatus which implements the magneto-optical recording and reproducing method of FIG. 11. A laser array is used as the laser light source 2. In FIG. 12A, the support spring 13, support arm 15 and magnetic head transport mechanism 16 shown in FIG. 1 are omitted. In FIG. 12A, the positional relationship of the focusing spot on the disk is shown with 90°-rotation in the plane of disk as is done in FIG. 1. The semiconductor laser array having two laser diodes LD1 and LD2 of different wavelengths mounted in one package is used as the light source. LD1 is a low power laser having a wavelength of 420 nm and used to reproduce the magneto-optical signal, and LD2 is a high power laser having a wavelength of 830 nm and used to record and erase the signal and to control a light spot. The positional relationship of the light spots SP1 (wavelength 420 nm) and SP2 (wavelength 830 nm) formed on the disk by those laser light sources is shown in FIG. 12B. The spot SP2 advances on the track. The diameter of the reproducing spot SP1 is approximately one half of that of the recording spot SP2. The crescent-shaped record domain having the minimum magnetic domain of approximately 0.35 μm recorded by the magnetic field modulation recording system can be reproduced by using the recording spot SP2 and the magnetic head 12. In the present embodiment, the information is recorded by the spot SP2 and an error is checked by the spot SP1. The error check is made by comparing the record signal and the magneto-optical signal reproduced by the spot SP2, by a comparator 17. The comparison result is supplied to a controller 18, which instructs rerecording if the signals are not equal, that is, if an error is detected. In the present embodiment, the input signal to the magnetic head drive circuit 14 is used as a reference signal for comparison although it may be the magnetic head drive current which is the output of the magnetic head drive circuit 14.

In the prior art magneto-optical disk, total of three disk revolutions, one for each of erasing, recording and checking are required to rewrite the information recorded on the disk. In the present embodiment, those three operations are done in one disk revolution and an effective data record time is significantly shortened.

In FIG. 12, the reproducing spot SP1 and the recording spot SP2 are irradiated from one optical head 11. Alternatively, the reproducing spot SP1 and the recording spot SP2 may be irradiated from separate optical heads. Such an embodiment is explained below.

Figure 13:
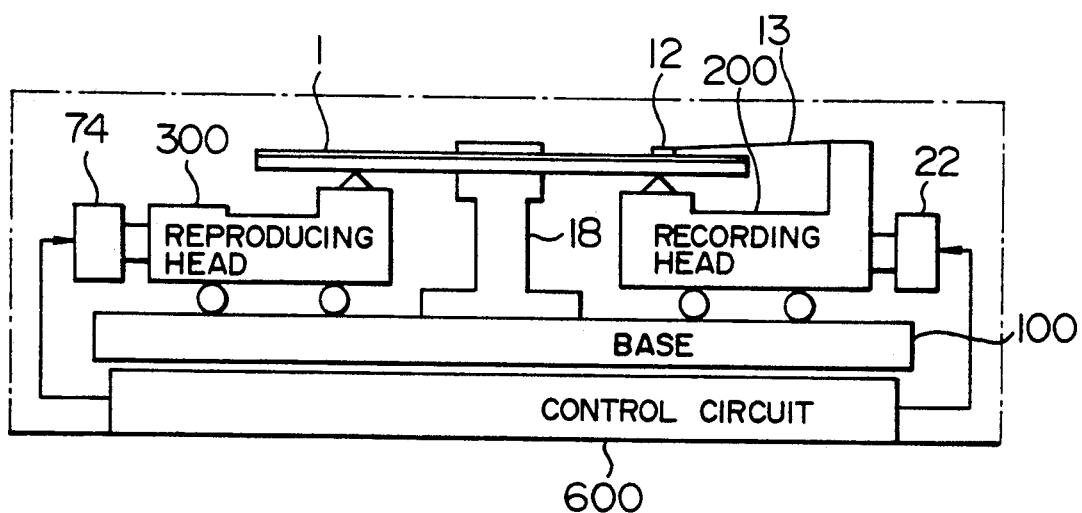
FIG. 13 shows an overall configuration of other embodiment of the present invention.

In the present embodiment a recording optical head and a reproducing optical head are separately provided and information is recorded by the magnetic field modulation recording system which permits recording of domains having a minimum domain length which is $\frac{1}{4}$–$\frac{1}{3}$ of the wavelength of the recording light source. The information is reproduced by the reproducing optical head by producing a laser beam having a wavelength which is one half of the wavelength of the recording light source from a light source having the same wavelength as that of the recording light source by using a second harmonics generator. In this manner, more than double recording density is attained compared to the recording and reproducing by the recording light source and more than double memory capacity is attained. FIG. 13 shows an overall configuration of a magneto-optical disk apparatus which is one embodiment of the magneto-optical recording and reproducing apparatus of the present invention. A recording optical head 200 and a reproducing optical head 300 mounted on a linear actuator are arranged to face each other or 90-degree shifted positions on a base 100. A spindle motor 18 is arranged at the center and an optical disk 1 is attached to the spindle motor 18 to rotate at a constant speed. The recording film of the magneto-optical disk 1 is formed by vapor deposition or sputtering of rear earth-transition metal. Detail of the recording film will be described later. A magnetic head 12 is arranged on the recording optical head 200 to face the magneto-optical disk 1 or on the side of the optical head. The information is recorded by the magnetic field modulation in which the direction of a current supplied to the magnetic head 12 is switched in accordance with the information to be recorded while a high output laser beam is irradiated from the recording optical head. The recording optical head 200 and the reproducing optical head 300 are radially movable by linear actuators 22 and 74, respectively, and they are positioned to the same track or any tracks by a control circuit 600.

Figure 14:
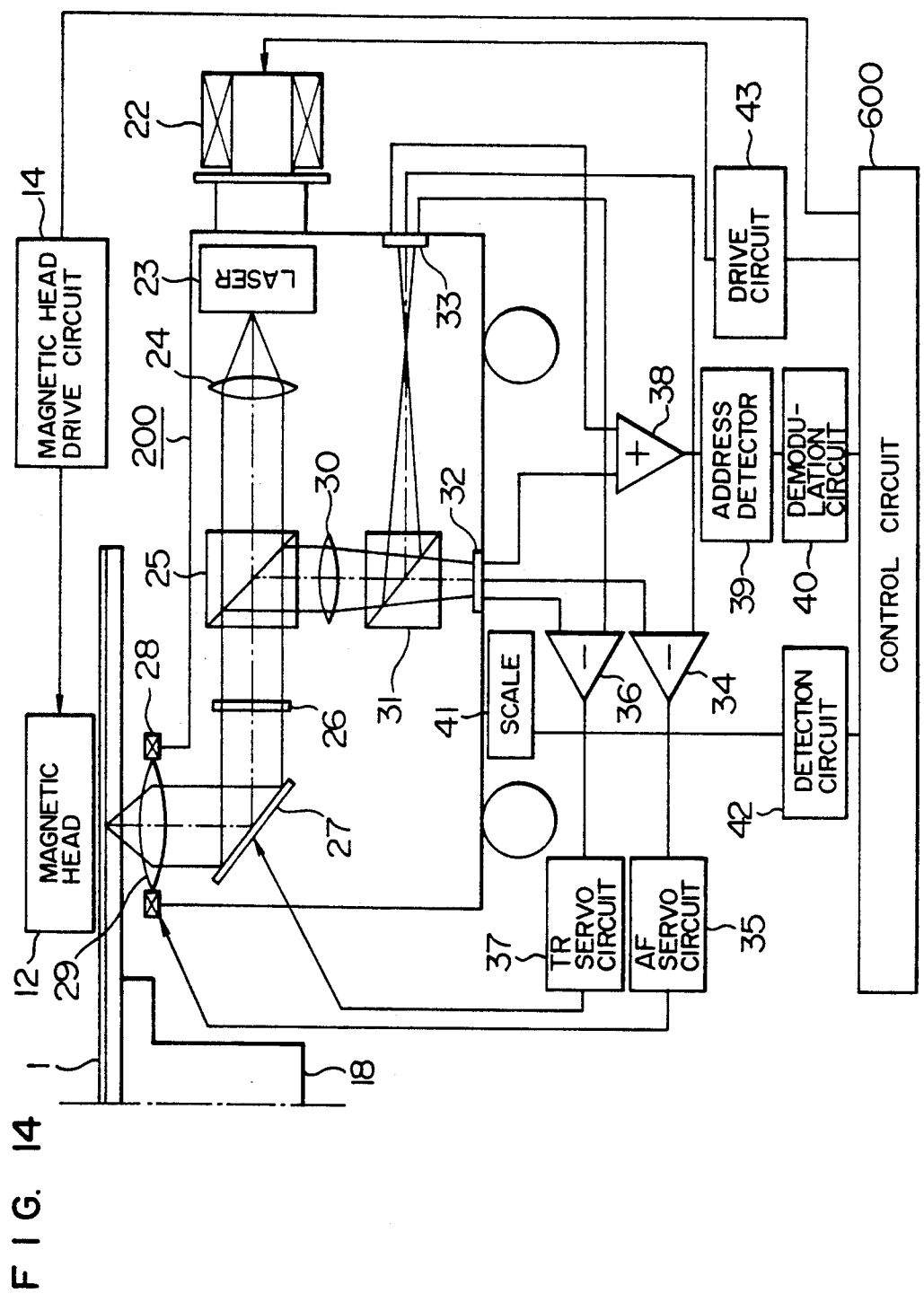
FIG. 14 illustrates a recording optical head of FIG. 13.

Referring to FIG. 14, the construction of the recording optical head 200 is explained in detail. A recording semiconductor laser 23 is of a high output power type having a wavelength of approximately 830 nm. A light beam emitted from the semiconductor laser 23 is condensed by a coupling lens 24 and it is collimated and passes through a polarization prism 25, a quarter wavelength plate 26 and a galvano mirror 27 and is directed to a focusing lens mounted or a voice coil 28. The light beam is focused into a spot SP2 of approximately 1 μm or the magneto-optical disk 1 by the focusing lens 29. The quarter wavelength plate 26 is arranged at an angle of 45 degrees relative to a polarization plane (P polarization) of the incident light, and it is circular-polarized on the magneto-optical disk 1. The semiconductor laser 23 produces a DC high output of approximately 10 mW on the magneto-optical disk when information is to be recorded to aid the temperature raise for recording the information by the magnetic field modulation, and produces, in other mode, a low output of 1-2 mW in order to read address information pre-recorded (or preformatted) on a track in the form of pit to position the light beam to a desired track. The light reflected by the magneto-optical disk 1 again passes through the focusing lens 29, the galvano mirror 27 and the quarter wavelength plate 26, and it is S-polarized and split by the polarization prism 25. Then, it is directed to a lens 30. The light is then divided into two equal parts by a half-prism 31 and they are directed to multi-divided photo-detectors 32 and 33 of the same shape. The photo-detector 32 is arranged in front of a focal point of the lens 30 and the photo-detector 33 is arranged behind the focal point of the lens 30. The outputs of the photo-detectors 32 and 33 are differentiated by a differential amplifier 34 to produce an auto-focusing detection signal, which is supplied to the voice coil 28 through an AF servo circuit 35 which includes a phase compensation circuit and a drive circuit. In this manner, the spot SP2 focused by the focusing lens 29 is kept in-focus irrespective of the vertical vibration of the magneto-optical disk 1. The technique of detecting the focusing signal by the front-back differentiation is disclosed in U.S. Pat. No. 4,742,218. Other outputs from the photo-detectors 32 and 33 are differentiated by a differential amplifier 36 to produce a tracking error detection signal which drives the galvano mirror 27 through a TR servo circuit 37 which includes a phase compensation circuit and a drive circuit. In this manner, the track is exactly traced by the spot SP2. Further, other outputs of the photo-detectors 32 and 33 are summed by an adder 38 to produce an address information signal pre-recorded on the track in the form of uneven pattern. It is digitized by an address information detection circuit 39, and a track address is detected by a demodulator 40. It is supplied to the control circuit 6 to position the optical head. An external scale 41 for accessing is mounted on the optical head 2. For example, a relative displacement may be determined by a moiré fringe caused by a movable scale and a stationary scale. A signal from the external scale 41 is pulsed by an external scale detection circuit 42 and it is supplied to a control circuit 600. The accessing is carried out by calculating a difference between a current address of the optical head 200 and a target address instructed from a host, dividing the difference by a pitch of the external scale, driving a linear actuator 22 by the quotient address through an actuator driver 43 to drive the optical head 200, and jumping the tracks by the number equal to an error to the target address by the galvano mirror 27. In the record mode, the semiconductor laser 23 generates the DC high output through a laser driver (not shown). An information signal to be recorded sent from the control circuit 600 is supplied to the magnetic head 12 through the magnetic head driver 14 and the direction of the current is switched to record the information by the magnetic field modulation system. The size of the domain recorded on the magneto-optical disk is not determined by the wavelenghth of the recording light source 23 and the numerical aperture (NA) of the focusing lens 19 as is done in the conventional optical disk such as the write-once type optical disk or the light modulation type magneto-optical disk, but it is determined by the switching time of the magnetic field by the magnetic head 12. Accordingly, the domain having the size which is ½-¼ of that of the conventional optical disk can be recorded. Since such a small domain cannot be resolved by the spot of the recording semiconductor laser 23, the domain information recorded is not reproduced by the recording head 200 in the present embodiment. Therefore, the recording head 200 of the present embodiment does not have a magneto-optical signal detecting optical system.

The construction of the reproducing optical head 300 is explained in detail with reference to FIG. 15. Since the reproducing head 300 is to reproduce the domain having a minimum domain length which is ½ to ¼ of that of the conventional optical disk, it is necessary that the wavelength of the reproducing light source is shorter than the recording wavelength, for example, approximately one half. In the present embodiment, the reproducing light source comprises a combination of an semiconductor laser 50 having the same wavelength as that of the recording light source and an optical wave guide type second harmonics generator 51. A light emitted from the semiconductor laser 50 is condensed by a lens 52 and directed to an optical wave guide path of the second harmonics generator 51. The second harmonics having one half wavelength of the recording wavelength, and phase-matched with a fundamental wave of the recording wavelength is radiated from the optical wave guide path conically at an angle θ. Accordingly, an optical element 53 which corrects, condenses and collimates the conically radiated light is arranged. The technique of generating the second harmonics and correcting and condensing such light is disclosed in U.S. patent application Ser. No. 07/408,537 (EP Application 89116784.3), the contents of which are incorporated herein by reference. The light having one half wavelength of the recording wavelength, from the optical element 53 passes through a polarization prism 54 which transmits n% (80>n>50) of a P-polarization component, and a galvano mirror 55 and is focused into a fine spot SP1 on the magneto-optical disk 1 by a focusing lens 57 mounted on a voice coil 56. The light reflected by the magneto-optical disk 1 again passes through the focusing lens 57 and the galvano mirror 55. It is then split by a polarization prism 54 and it is directed to a one-half wavelength plate 58, a lens 59 and a polarization prism 60. The one-half wavelength plate 58 is set at an angle of 22.5 degrees relative to a polarization plane in order to rotate the polarization plane of an incident light to the polarization prism 60 by 45 degrees. In this manner, the light reflected by the magneto-optical disk 1 is divided into two, a P-polarization component and an S-polarization component, and they are directed to photo-detectors 61 and 62 arranged in front of and behind the focal point of the lens 59, in order to detect the auto-focusing detection signal, the tracking error detection signal and the address signal as they are detected by the recording optical head 200. Further, a magneto-optical signal is detected by utilizing a Kerr effect in which a polarization plane of the reflected light is slightly rotated depending on the upward or downward direction of magnetized film on the magneto-optical disk 1. The outputs from the photo-detectors 61 and 62 are differentiated by a differential amplifier 63 to produce an auto-focusing detection signal, which drives the voice coil 56 through an AF servo circuit 64 which includes a phase compensation circuit and a drive circuit. In this manner, the spot SP1 focused by the focusing lens 57 is kept in-focus. Other outputs from the photo-detectors 61 and 62 are differentiated by a differential amplifier 65 to produce a tracking error signal, which drives the galvano mirror 55 through a TR servo circuit 66 which includes a phase compensation circuit and a drive circuit. In this manner, the spot SP1 can exactly trace the track. Other output from the photo-detectors 61 and 62 are summed by an adder 67 to produce an address information signal pre-recorded on the track. It is digitized by an address information detection circuit 68, and a track address is detected by a demodulator 69. It is supplied to the control circuit 600 to position the optical head 300. The address information pre-formatted on the track should be read by both of the recording optical head 200 and the reproducing optical head 300. It is in the form of phase-structured pit. The size of the pit should be large enough to permit the reading by the recording optical head 200 having a longer wavelength light source, and a minimum pit length is no smaller than the wavelength of the recording light source (semiconductor laser 23). The outputs of the photo-detectors 61 and 62 with the address information signal are differentiated by a differential amplifier 70 to produce a magneto-optical signal, which is supplied to the control circuit 600. An external scale 71 for accessing is attached to the reproducing optical head 300 as it is in the recording optical head 200. It is pulsed by an external scale detection signal 72 and supplied to the control circuit 600. A linear actuator 74 is driven through an actuator drive circuit 73 by an instruction from a host so that the reproducing optical head 300 may be positioned to a desired track.

Figure 16A:
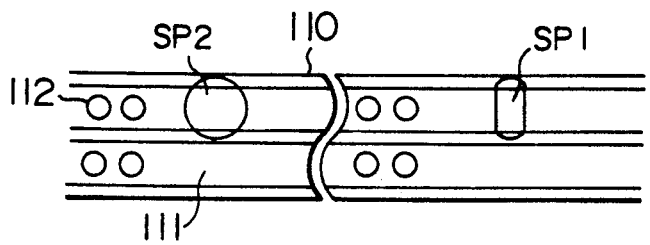
FIGS. 16A and 16B illustrate a tracking error detection method of FIG. 13.
Figure 16B:
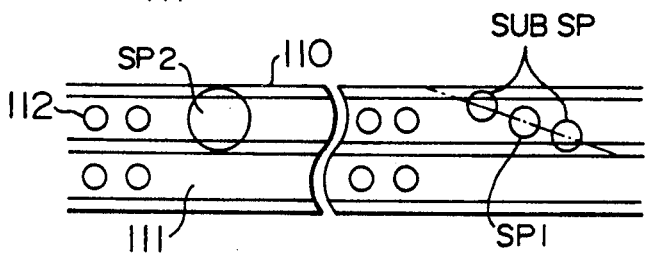
Figure 17:
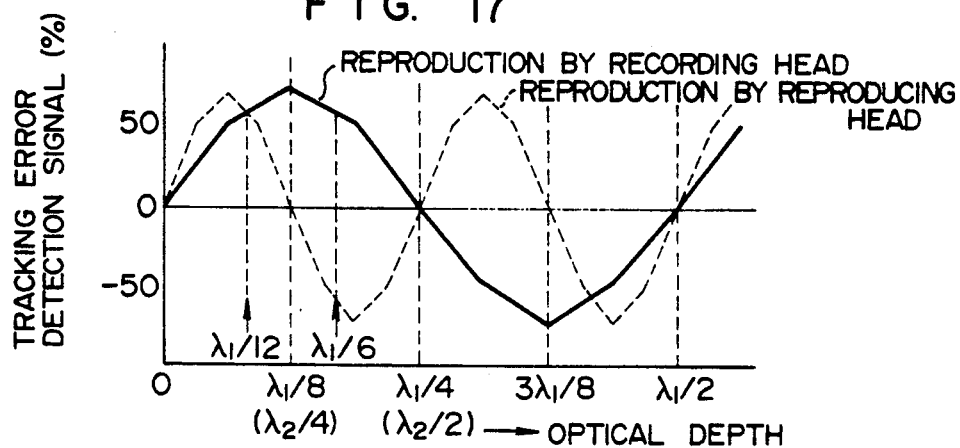
FIGS. 17 and 18 illustrate a tracking error detection operation and an address pit signal detection operation of FIG. 13, respectively.
Figure 18:
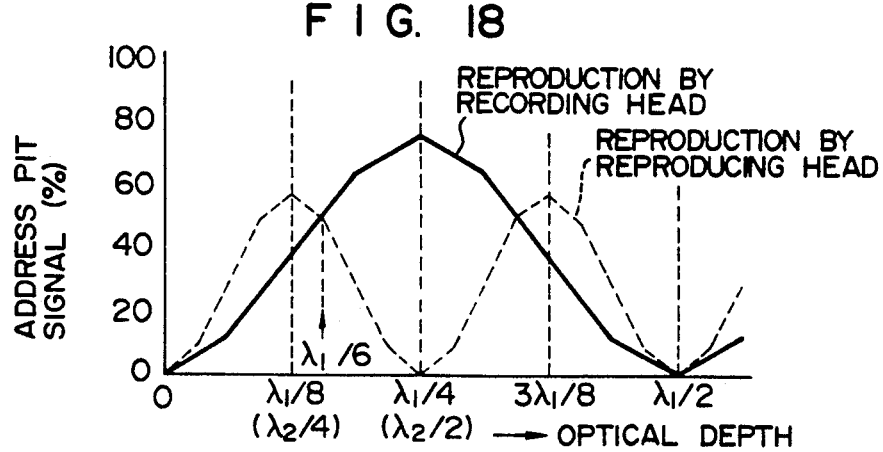

In the present embodiment, it is necessary to follow the same track by the recording optical head 200 and the reproducing optical head 300 having different wavelengths. A tracking method is explained with reference to FIG. 16. The tracking method includes a diffraction light differential method (push-pull method) and a 3-spot method. First, the diffraction light differential method for the recording optical head 200 and the reproducing optical head 300 is explained with reference to FIG. 16A. Guide grooves 110 are pre-formed spirally at a constant pitch on the disk 1. The pitch is substantially equal to a spot diameter $D1 = \lambda1/NA1$ where $\lambda1$ is the wavelength of the recording light source (semiconductor laser 23) and NA1 is the numerical aperture of the focusing lens 29 mounted on the recording optical head 200. In the diffraction light differential type, a center of track and a division line of the 2-split photo-detector coincide with respect to the reflected diffraction light from the disk 1, and the tracking error detection signal is detected by a difference between the two outputs of the 2-split photo-detector. An amplitude of the tracking error detection signal is determined by an optical depth of the guide groove 110. The tracking error detection signal is maximum when the optical depth of the guide groove 110 is ⅛ of the wavelength of the light source, and minimum or zero when it is ¼ of the wavelength. In the present embodiment, it is necessary that the optical depth of the guide groove 110 is set so that it is not equal to ¼ of each of the two different wavelengths, that is, the wavelength $\lambda1$ of the recording optical head and the wavelength $\lambda2$ ($=\lambda\frac{1}{2}$) of the reproducing optical head. As a first setting, the optical depth of the guide groove 110 may be set to $\lambda1/12$ ($=\lambda2/6$), and as a second setting, the optical depth of the guide groove 110 may be set to $\lambda1/6$ ($=\lambda\frac{1}{3}$). This is illustrated in FIG. 17 in which calculated result of the tracking error detection signal by a diffraction calculation o formula of the optical disk is shown, with $\lambda1=830$ nm, ($\lambda2-4/5$ nm), the shape of the guide groove 110 being rectangular, the width of the guide groove 110 being about 0.4 μm, the track pitch being about 1.6 μm and the numerical aperture (NA) of the focusing lens being 0.55, where a sign of − represents a polarity. In this manner, the amplitude of the tracking error detection signal at the recording optical head 200 and the amplitude of the tracking error signal at the reproducing optical head 300 are made equal to each other. However, when the second setting is used, the polarity of the tracking error detection signal at the recording optical head 200 and the polarity of the tracking error detection signal at the reproducing optical head 300 are different. Since the pitch of the guide grooves 110 is equal to the size of the focusing spot SP2 (FIG. 16) of the recording light source, if the focusing spot SP1 irradiated by the reproducing optical head is circular, the focusing spot SP1 is too small relative to the pitch of the guide groove 110 and a dead band is created in the tracking error detection signal around the center of the track. In order to prevent it, the spot SP1 of the reproducing optical head 300 is rendered oval extending transversely to the track as shown in FIG. 16A, by the optical element 53 in FIG. 15. The trackwise size of the oval spot SP1 is one half of that of the spot SP2. Address pits 112 which represent the address information are recorded on a land of a track having a center between adjacent guide grooves as a track center. When the optical depth of the preformatted pits such as address pits is equal to $\lambda1/6$ ($=\lambda\frac{1}{3}$) like in the second setting described above, the amplitudes of the address information signals detected by the recording optical head 200 and the reproducing optical head 300 are rendered equal (FIG. 18). In FIG. 18, the address pit signal is calculated with the same parameters as those used in the calculation of the tracking error detection signal.

The operation when the diffraction light differential type is used for the recording optical head 200 and the 3-spot type is used for the reproducing optical head 300 is explained with reference to FIG. 16B. The diffraction light differential type in the recording optical head 200 has been described above and it is omitted here. In the 3-spot type, 0-order light and ±1-order lights are generated by a diffraction grating, and the 0-order light is used as a main beam SP1 and positioned at the center of the track to read the information. The ±1-order lights are used as sub-beams and positioned closely to the guide groove 110. The outputs of the two photo-detectors corresponding to the two sub-beams are differentiated to produce the tracking error detection signal. The optical depth of the guide groove 110 is equal to $\lambda\frac{1}{4}$ ($=\lambda2/4$). As a result, a maximum tracking error detection signal is produced by the recording optical head 200 of the diffraction light differential type and a maximum tracking error detection signal is also produced by the reproducing optical head 300 of the 3-spot type. The diffraction grating is most preferably arranged between the optical element 53 and the polarization prism 54 in the reproducing optical head 300. The optical depth of the address pits 112 which represent the address information is preferably equal to λ1/6 (=⅔) as it is in FIG. 16A so that the information may be reproduced either by the recording optical head 200 or by the reproducing optical head 300. In the above description, information is recorded and reproduced on and from one disk. The present invention is also effective in recording and reproducing information on and from stacked multi-disks. The 3-spot tracking method per se has been known by, for example, U.S. Pat. No. 3,876,842.

In FIG. 19, the light 21 irradiated to the magneto-optical disk 1 is only one which has the wavelength of 420 nm and the intensity of the light 21 is switched to record and reproduce the information. The S/N ratio is improved over a case where the information is recorded and reproduced by using only the light having a wavelength of 830 nm.

In FIG. 20, the light 21 having the wavelength of 420 nm is formed into a number of circular spots by an acousto-optical element 90, and they are overlapped to form an oval spot SP2'. The end portions of the crescent-shaped domain are shortened when the light spot SP2' is used to record the information. When the domain is read by the circular or oval spot having the wavelength of 420 nm, the SN ratio is improved over a case where the information is recorded by the circular spot.

In addition to the acousto-optical element, a diffraction grating may be used as means for forming the oval light spot. Where the recording spot and the reproducing spot are oval, the optical system is simplified.

The end portions of the crescent-shaped domain become long in a high speed recording (higher than a linear velocity of 15 m/sec) because the light intensity at the center of the spot is high in the circular light spot and hence the temperature rise at the center of the light spot is high. As shown in FIG. 21, in this case, the amplitude of the reproduced signal is small and the S/N ratio is lowered. When the oval light spot having the oval intensity distribution along the radius of the disk is used, the temperature distribution along the radius of the disk is substantially constant and the domain having short end portions can be recorded. In this case, the amplitude of the reproduced signal is large and the S/N ratio is improved.

Figure 22:
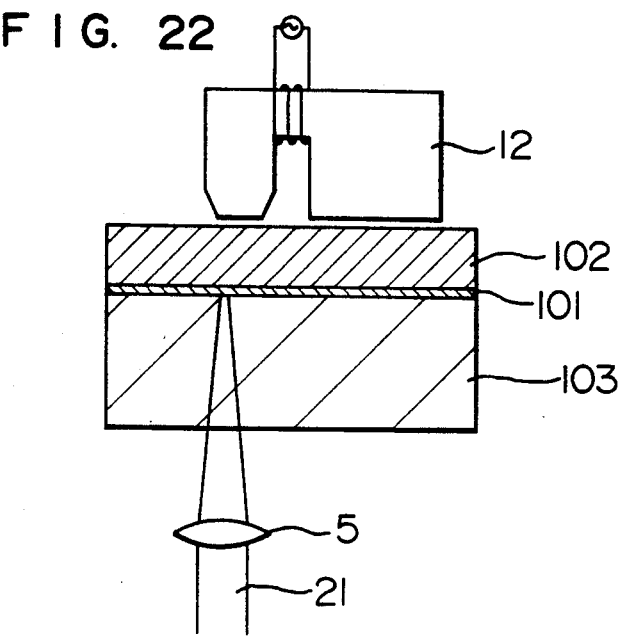
FIG. 22 shows a principle of the magneto-optical recording by the magnetic field modulation recording system.
Figure 23:
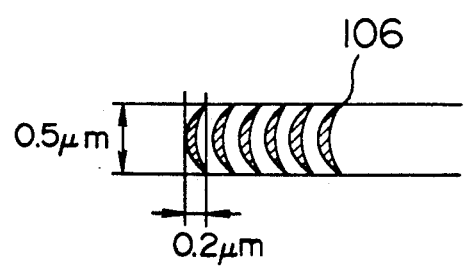
FIG. 23 shows a diagram of a record domain produced by the magnetic field modulation recording system.

A principle of the magneto-optical recording of the magnetic field modulation recording system used in the present embodiment is illustrated in FIG. 22. In the disk 1, a magneto-optical recording medium 101 and a protective film 102 are formed on a substrate 103. Information is recorded by switching the magnetic field by the floating magnetic head 12 while a laser beam 21 is continuously irradiated to the recording medium through the lens 5. The recorded domains are shown in FIG. 23. It was recorded at a disk rotation speed of 2400 Vpm, a recording laser power of 7 mW, a laser beam wavelength of 500 nm and a frequency of 30 MHz. It was attempted to reproduce it by a conventional circular light spot but the noise level was very high and the reproduced output was very small. The recorded information could not be reproduced at all because the light spot was much larger than the record domain. Then, the information was reproduced by using the optical system shown in FIG. 24. As described above, the shape of the record domain is crescent. The laser beam 21 is irradiated through a slit 160 having a slightly larger crescent-shaped hole than the crescent-shape of the record domain. The light transmitted through the slit 160 is focused by the lens 5 to form an image 170 on the recording film 101 formed on the disk substrate 103. A magnitude relationship between the image 170 and the record domain 180 is shown enlarged at a left top of FIG. 24. If the size of the image is too larger than the record domain, it overlaps with an adjacent domain to cause cross-talk and error. The image may be focused by an auto-focusing (AF) circuit similar to that of the tracking signal. By using the light having the spot shape thereof controlled, the recorded signal can be reproduced without error. A maximum CN ratio (carrier to signal ratio) was 43 dB (NA=0.60). This means that the recorded small domain can be read out with a high resolution power without cross-talk.

In the present embodiment, the shape of the light spot is controlled by the magnetic field modulation recording system for use in the magneto-optical recording. It is needless to say that the present invention is applicable to write-once type optical recording having small pits, phase change type optical recording as well as any optical recording such as CD-ROM, compact disk and laser disk. The slit may be a dark-bright pattern formed on a glass plate.

Figure 24:
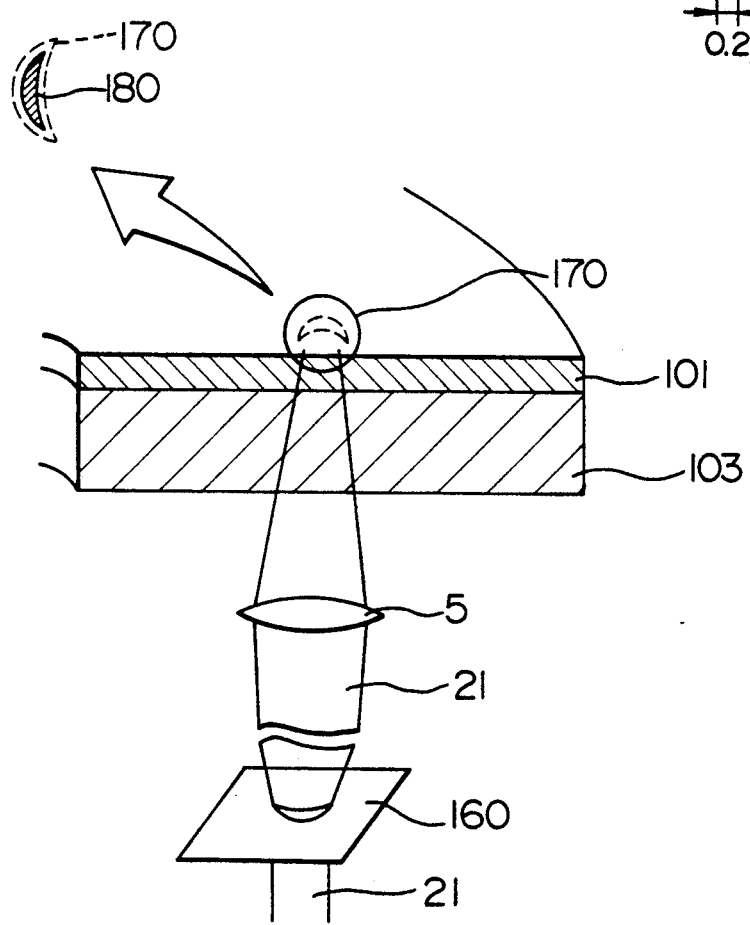
FIG. 24 shows a principle of reproduction by a spot shape controlled optical system.

An example of single wavelength has been described. An example where two light sources having different wavelength in now explained. In this example, the wavelength of the recording and erasing light and the wavelength of the reproducing light are different. The wavelength of the reproducing light is shorter than the wavelength of the recording and erasing light. For example, the reproducing light is of 500 mm and the recording and erasing light is of 780 nm. Two optical system may be used as shown in FIG. 13 or two light sources may be appropriately switched or mixed as shown in FIG. 12. In any case, what is important is to utilize the light having the spot shape thereof controlled as shown in FIG. 24 for at least the reproducing system.

By controlling the spot shape of the recording laser beam, the shape of the record domain formed can be controlled. This results in further improvement of the recording density.

A multi-layer structure magneto-optical recording film used in the present invention is now explained. By using the multi-layer structural magneto-optical recording film of the Present invention, a magneto-optical effect is maximized in a vicinity of a wavelength of 400–600 nm. Information can be reproduced with a high S/N ratio from a recording medium having domains smaller than the recording spot formed thereon by the magnetic field modulation recording system and information recorded thereon at a high S/N ratio and a high density. Where the film thickness of the metal layer is smaller than 50 nm to permit the transmission of the light and a metal reflection layer is arranged on the opposite side to the incident side of the light, the light utilization efficiency is improved and a larger magneto-optical effect is attained by the combination of the Kerr effect and the Faraday effect. Thus, very high density optical recording is attained. Since the metal layer also controls the heat diffusion in the disk in addition to the improvement of the light utilization efficiency, the mutual diffusion between the recording film layers and the relief of the amorphous structure can be suppressed and the protection property of the recording film can also be suppressed. Thus, the reliability of the recording medium is significantly improved.

Figure 25:
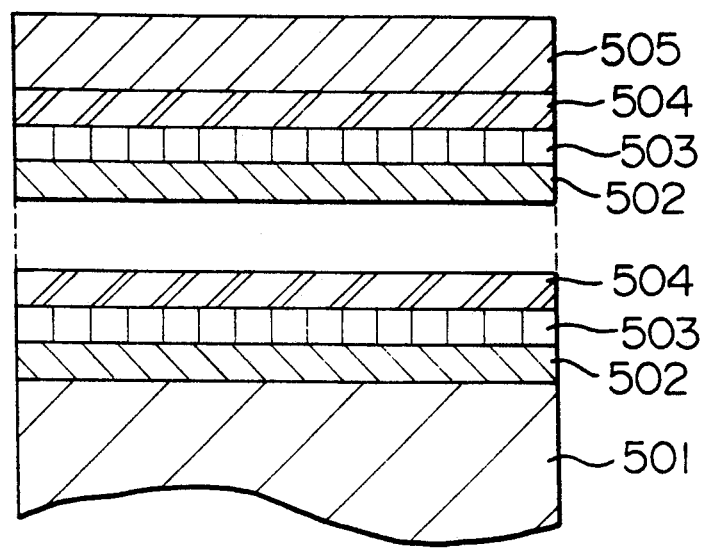
FIGS. 25, 28, 30 and 32 show sectional views of structures of the magneto-optical disk in the embodiments of the present invention.

In an embodiment of FIG. 25, Pt, and Co recording films and SiNx films are alternately laminated. The disk is manufactured by a sputtering method. A sectional structure thereof is shown in FIG. 25. Targets were Pt, Co and $Si_3N_4$, and a manufacturing atmosphere was Ar and a pressure was 0.67 Pa ($5 \times 10^{-3}$ Torr) The Pt film 502 and the Co film 503 were formed on the substrate 501 by a DC sputtering method, and the $Si_3N_4$ film 504 was formed by an RF sputtering method. A characteristic of the resulting film is not affected even if all there films are formed by the RF sputtering method. During sputtering, the substrate 501 was rotated at 100 rpm. The three elements were simultaneously discharged, rotated at a high speed and laminated to form the multi-layer structure. By this method, the substrate 501 is present in any one of plasmas and is hard to take into impurity gas component such as oxygen, and has a high errosion resistance.

The Pt film 502 is of 10 Å thick, the Co film 503 is of 5 Å thick and the SiNx film 504 is of 8 Å or 10 Å thick. The thicknesses of the respective films were controlled by controlling the RF power or the current in the DC sputtering. Twenty combinations of the Pt layer 502, Co layer 503 and SiNx layer 504 were formed. Then, an $Al_{85}Ti_{15}$ film of 500 Å thick was formed as a reflection layer 504.

The material of the reflection film is selected in accordance with a desired recording sensitivity of the disk. The materials Pt, Pd, Rh, Ag and Au have high reflection coefficients and high thermal conductivity. Ti, Ta, Nb, Cr or Ni is added thereto to control the thermal conductivity and improve the errosion resistance of the reflection film 505 to improve the protection ability of the recording film. In this manner, a magneto-optical disk having a high reliability is manufactured.

Figure 26:
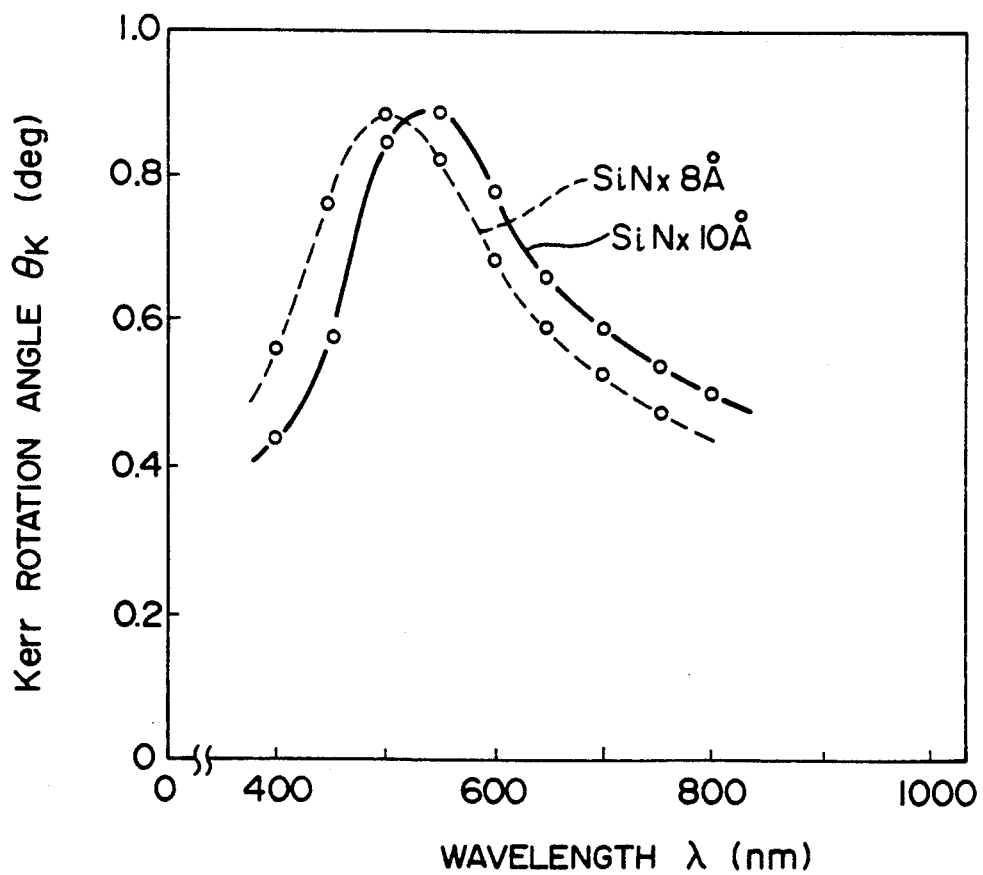
FIGS. 26, 29 and 31 show laser beam wavelength dependencies of the optical disks of the embodiments to a Kerr rotation angle.

FIG. 26 shows wavelength dependency of the recording film thus formed to the Kerr rotation angle. A broken line shows the characteristic of the SiNx film 504 of 8 Å thick, and a solid line shows the characteristic of the SiNx film 504 of 10 Å thick. By controlling the thickness of the SiNx film, the wavelength at which the Kerr rotation angle reaches a peak value can be changed. Thus, a maximum Kerr rotation angle for the wavelength of the light used can be attained. As the means therefor, a refractive coefficient of SiNx may be controlled instead of changing the thickness of the SiNx film. When the alternate laminated films of only the Pt films 502 and the Co films 503 without the SiNx film 504, the resulting rotation angle is reduced to 0.3°–0.4° ($\lambda = 400$–600 nm). By alternately laminating the three layers Pt/Co/SiNx, a sufficiently large increase in the Kerr rotation angle is attained only by the recording film.

Figure 27:
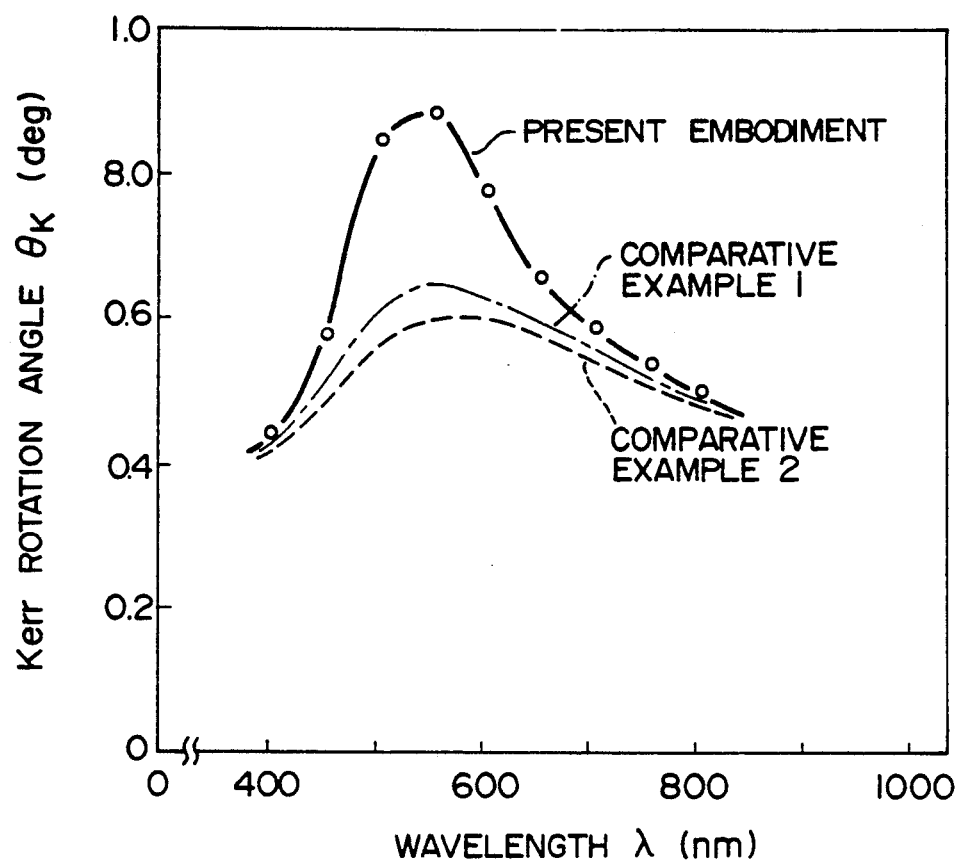
FIG. 27 shows a relation between a total metal film thickness of the magneto-optical disk and the Kerr rotation angle in the present invention.

In the alternate laminated film, when the total thickness of the metal layers exceeds 500 Å and reaches 600 Å, the light absorption remarkably increases and the Kerr rotation angle decreases, as shown in FIG. 27 (comparative example 1). Where the reflection layer 505 is not provided, the light utilization efficiency lowers even if the total thickness of the metal films is smaller than 500 Å and the rotation angle is not increased (comparative example 2). Thus, the control of the total film thickness and the provision of the reflection film are effective in attaining a high performance magneto-optical disk.

In the present embodiment, the same effect is attained when Pd or Au is used in place of Pt and Fe is used in place of Co. Further, SiO or AlN may be used in place of SiNx. Any dielectric material which is optically transparent (transparent at the wavelength of the light used) and does not react with a recording film material may be used. The reflection film material is not limited to Al or Al alloy but any material may be selected in accordance with a desired recording sensitivity.

By providing the reflection film described above, the temperature rise of the recording film due to the irradiation of the laser beam for recording or erasing can be suppressed. As a result, the mutual diffusion between layers, particularly between metal layers due to recording or erasing is hard to occur and a change of a magnetic characteristic by the repetition of erasure can be suppressed.

In the structure of FIG. 25, the light is directed from the substrate side. A similar effect may be attained when the reflection layer 505 is formed on the substrate 501, the record layers 502–504 are formed thereon alternately, and the light is directed from the medium side to effect recording, reproducing or erasing.

When it is actually used as a disk, an optical effect enhancement film (Kerr enhancement film) of an inorganic dielectric material represented by silicon nitride may be provided between the substrate 501 and the multi-layer recording films 502–504.

Figure 28:
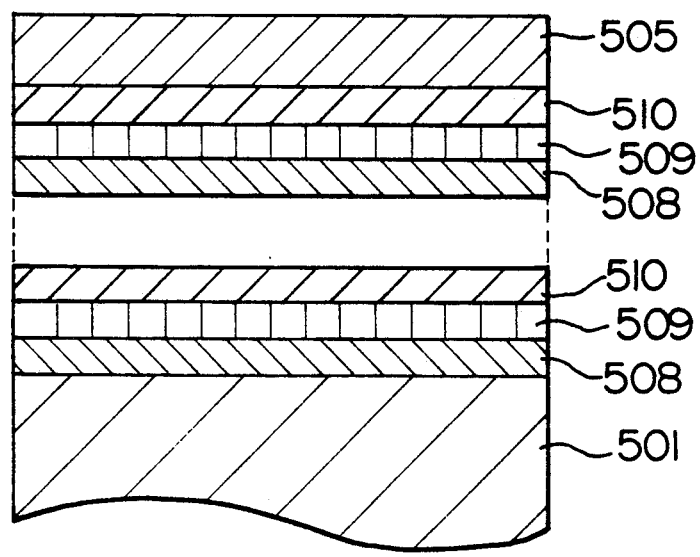

In an embodiment of FIG. 28, a Pd layer 508, a FeCo layer 509 and a $SiO_2$ layer 510 are alternately laminated on a substrate 501. The manufacturing method is same as that in the embodiment of FIG. 25 and the 3-element simultaneous sputtering method is used. The thickness of the respective layers are approximately 12 Å for the Pd layer 508, approximately 6 Å for the FeCo layer 509, and approximately 8 Å for the SiO layer 510. The total thickness of the alternate laminated layer is approximately 400 Å. Then, AuPd is sputtered to a thickness of 500 Å to form the reflection layer 505 to complete the disk.

Figure 29:
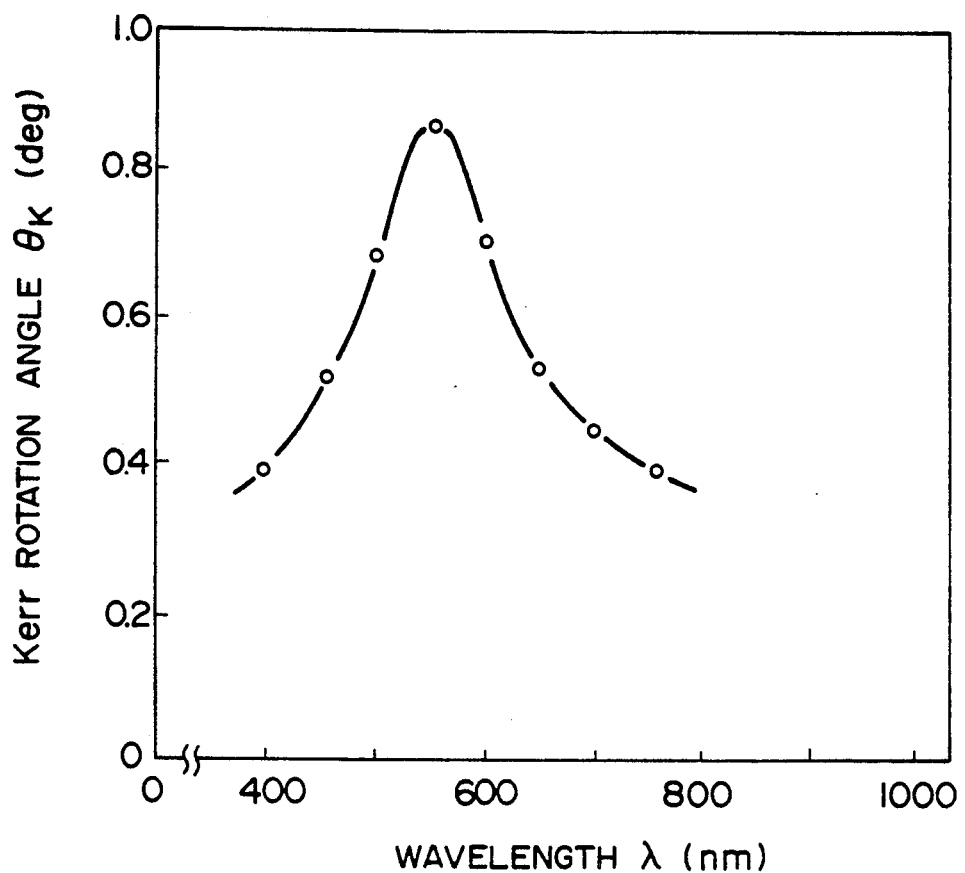

FIG. 29 shows a waveform dependency of the disk to the Kerr rotation angle. In this case, a recording film which has a peak Kerr rotation angle in a vicinity of 480 nm was formed. When Pt-Fe-Co-SiNx was combined, the Kerr rotation angle was increased to about 0.9 degree. When Pd-Co-SiO was used, the maximum angle was 0.65 degree, but when FeCo alloy was used, the Kerr rotation angle increased compared to a case where Fe or Co was used singly. Pt, Au or Rh may be used in place of Pd, and any dielectric material film represented by SiNx, $AlF_3$ or $Al_2O_3$ may be used in place of SiO. Instead of directing the laser beam from the substrate side, the reflection film may be formed on the substrate side and the recording films may be alternately laminated thereon and the light may be directed from the film side.

A magneto-optical effect enhancement film (Kerr enhancement film) of an inorganic dielectric material may be formed between the substrate 501 and the multi-layer recording films 508–510 in order to improve the performance.

Figure 30:
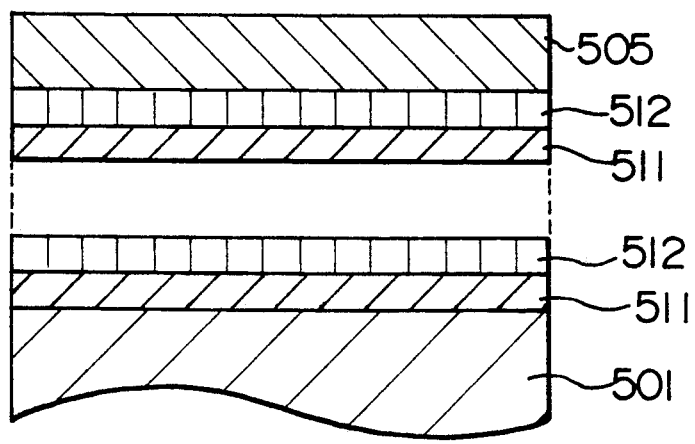

In an embodiment of FIG. 30, a PtCo alloy layer 511 and an AlN layer 512 are alternately laminated on the substrate 501. The manufacturing method is same as that in the embodiment of FIG. 25 and two-element simultaneous sputtering method is used. The thicknesses of the respective films are 5 Å for the PtCo layer 511, and 3 Å for the AlN layer 512. Then, a CuNb film is formed to a thickness of 500 Å to form the reflection layer 502 to complete the disk.

Figure 31:
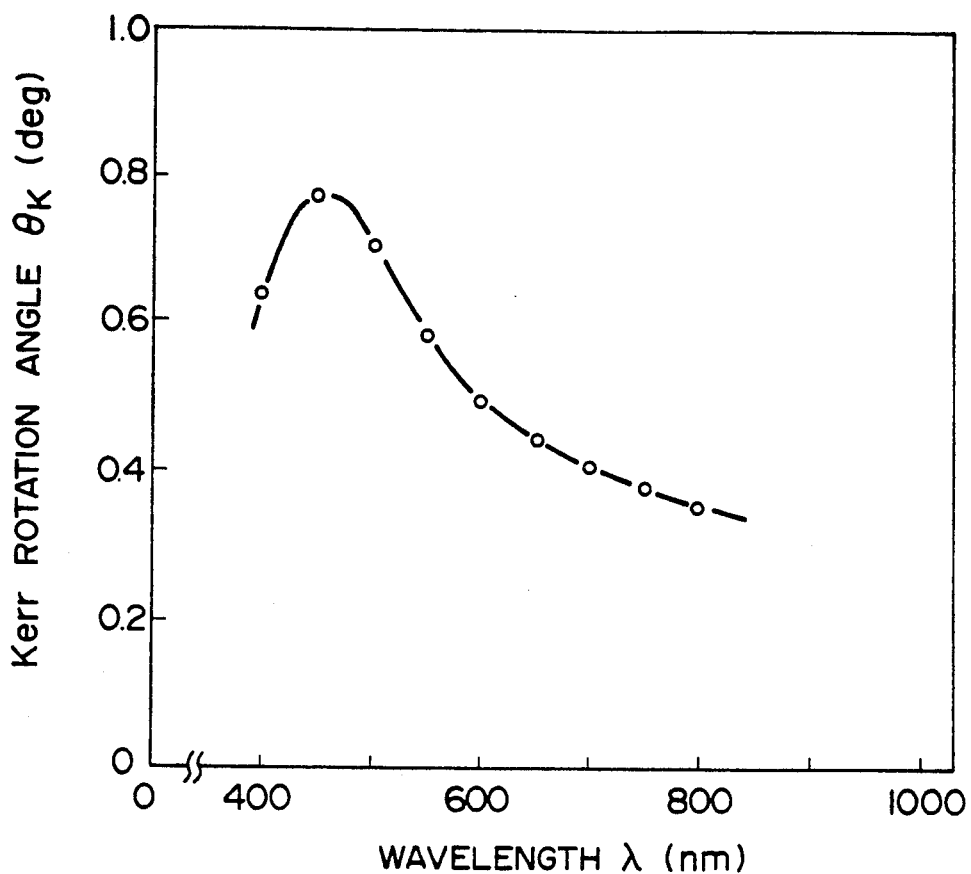

FIG. 31 shows a wavelength depending of the disk to the Kerr rotation angle. In the disk of the present embodiment, the rotation angle is maximum in the vicinity of the wavelength 450 nm of the laser beam. The peak value can be controlled by controlling the thicknesses of the respective layers. By using PtCo alloy, a larger Kerr rotation angle than that obtainable when PtCoFe alloy is used is attained. Instead of directing the light from the substrate side, the reflection film may be formed on the substrate and the recording layers may be formed thereon and the light may be directed from the film side.

A magneto-optical Kerr effect enhancement film (Kerr enhancement film) may be formed between the substrate 501 and the multi-layer recording films 511 and 512 in order to improve the Kerr effect.

Figure 32:
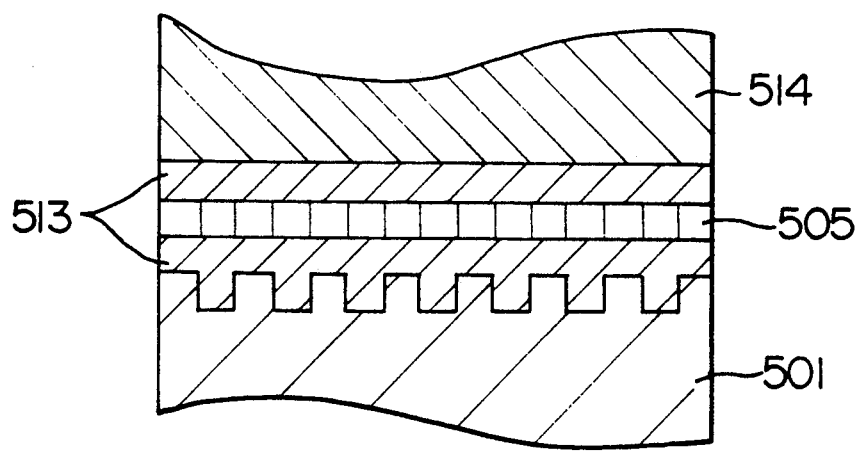

A sectional view of a double-side disk having the multi-layer recording films formed in the above embodiment is shown in FIG. 32. The recording film medium 513 having the multi-layer structure shown in the embodiment of FIG. 25, 28 or 30 is formed on the disk substrate 501 having a spiral guide groove or circular guide groove, the metal reflection film 505 is formed thereon, the recording film media 513 having the multi-layer structure is again formed, and a flat substrate 514 made of the same material as that of the substrate having the guide groove is bonded to the multi-layer structure. In this manner, the double-side disk can be manufactured in a simple method. Since only one substrate which has the guide groove is required, the manufacturing cost of the disk can be reduced.

In accordance with the recording medium of the present invention, the layers having the magnetic anisotropy and the dielectric material made of the inorganic compound are alternately laminated and the thicknesses of the respective layers are controlled to attain maximum Kerr and Faraday rotation angles at the wavelength of the laser beam used. A material which shows a large rotation angle in a short wavelength band, for example, around 400–600 nm and a high errosion resistance is a Pt group element—Fe group element alloy. Where the Pt group element and the Fe group element are alternately laminated, the anisotropy is increased and the magneto-optical film is stabilized. This characteristic is enhanced by alternately laminating the recording film and the dielectric material. The lamination in the order of angstrom (Å) is particularly effective. As a result, a recording film having a significantly large magneto-optical effect even in the short wavelength band can be formed and a sufficiently high reproduced signal may be produced even with a high density recording.

We claim:

1. An information recording and reproducing method comprising the steps of:
    applying a magnetic field of a polarity corresponding to information to be recorded while a recording spot of a high energy is irradiated to a magneto-optical recording medium to record domains in the recording medium representing the information along a track, each domain having a length extending along the track which is smaller than a size of the irradiated recording spot; and
    reading out the domains by a reproducing spot having a lower energy and a shorter wavelength than the energy and wavelength of the irradiated recording spot wherein the reproducing spot is formed by a laser beam having a wavelength of no longer than 600 nm.

2. An information recording and reproducing method according to claim 1 wherein the recording spot is formed by a laser beam having a wavelength of no shorter than 600 nm.

3. An information recording and reproducing method according to claim 1 wherein the reproducing spot is formed by a second harmonics generated by a second harmonic generator.

4. An information recording and reproducing method according to claim 1 wherein a shape of at least one of the recording spot and the reproducing spot extends perpendicularly to the track.

5. An information recording and reproducing method according to claim 1 wherein the recording spot and the reproducing spot are irradiated through one objective lens, and a focusing signal and a tracking signal are detected from a reflected light of the recording spot.

6. An information recording and reproducing method according to claim 1 wherein the recording spot and the reproducing spot are irradiated through separate objective lenses, a focusing signal, a tracking signal and a reproduced signal obtained from address bits previously provided in the magneto-optical recording medium are detected from reflected lights of the recording spot and the reproducing spot, respectively.

7. An information recording and reproducing method according to claim 6 wherein a shape of the reproducing spot extends perpendicularly to the track, an optical depth of a guide groove formed in the magneto-optical recording medium is selected such that an amplitude of a tracking signal by the recording spot and an amplitude of a tracking signal by the reproducing spot are substantially equal to permit the following of the guide groove by the recording spot and the reproducing spot.

8. An information recording and reproducing method according to claim 6 wherein three spots are irradiated through an objective lens for irradiating the reproducing spot, a middle spot is used as the reproducing spot and end spots are used to detect a tracking signal, and an optical depth of a guide groove formed in the magneto-optical recording medium is set such that an amplitude of the tracking signal by the recording spot is substantially maximum.

9. An information recording and reproducing method according to claim 6 wherein an optical depth of pits formed in the magneto-optical recording medium is set such that an amplitude of a reproduced signal from the address bits by the recording spot and an amplitude of a reproduced signal from the address bits by the reproducing spot are substantially equal.

10. An information recording and reproducing method according to claim 1 wherein a multi-layer recording film having a number of metal layers and dielectric layers alternately laminated is used.

11. An information recording and reproducing method according to claim 10 wherein said metal layer includes at least one material layer selected from Pt, Pd, Rh and Au and at least one material layer selected from Co and Fe.

12. An information recording and reproducing method according to claim 10 wherein said metal layer is an alloy layer formed of at least one element selected from Pt, Pd, Rh, Ca and Au and at least one element selected from Co and Fe.

13. An information recording and reproducing method according to claim 10 wherein a light reflection layer is formed on a lowermost or uppermost layer of the multi-layer structure.

14. The method according to claim 1, wherein said recording spot has a light intensity distribution of a trapezoidal shape along a direction perpendicular to the track.

15. The method according to claim 1, wherein said reproducing spot has a diameter in the direction of the track equal to about a half of a diameter of the recording spot and a diameter in a direction normal to the track which is substantially equal to the diameter of said recording spot.

16. The method according to claim 1, wherein said domain has a crescent shape.

17. The method according to claim 1, wherein the length of the domain is equal to or smaller than a half of a diameter of the recording spot.

18. An information recording and reproducing method comprising the steps of:
   applying a magnetic field while a recording spot having a high energy is irradiated to a magnetic-optical recording media and switching a polarity of the magnetic field in accordance with information to be recorded to record domains representing the information along a track; and
   reading out the domains by a reproducing spot having a lower energy and a higher resolution power along the track than the recording spot, the reproducing spot having a low energy emitted from a laser beam having a wavelength of no greater than 600 nm which is shorter than a wavelength of the irradiated recording spot.

19. An information recording and reproducing method according to claim 18 wherein the recording spot is formed by a laser beam having a wavelength of no smaller than 600 nm.

20. An information recording and reproducing method according to claim 18 wherein the reproducing spot is formed by a second harmonics emitted from a semiconductor laser having a wavelength of 830 nm.

21. An information recording and reproducing method according to claim 18 wherein the recording spot and the reproducing spot are irradiated through one objective lens, and a focusing signal and a tracking signal are detected from a reflected light of the recording spot.

22. An information recording and reproducing method according to claim 18 wherein the recording spot and the reproducing spot are irradiated through separate objective lenses, a focusing signal, a tracking signal and a reproduced signal obtained from address bits previously provided in the magneto-optical recording medium are detected from reflected lights of the recording spot and the reproducing spot, respectively.

23. An information recording and reproducing method according to claim 22 wherein a shape of the reproducing spot extends perpendicularly to the track, an optical depth of a guide groove formed in the magneto-optical recording medium is selected such that an amplitude of a tracking signal of the recording spot and an amplitude of a tracking signal of the reproducing spot are substantially equal to permit the following of the guide groove by the recording spot and the reproducing spot.

24. An information recording and reproducing method according to claim 22 wherein three spots are irradiated through an objective lens for irradiating the reproducing spot, a middle spot is used as the reproducing spot and end spots are used to detect a tracking signal, and an optical depth of a guide groove formed in the magneto-optical recording medium is set such that an amplitude of the tracking signal by the recording spot is substantially maximum.

25. An information recording and reproducing method according to claim 22 wherein an optical depth of pits formed in the magneto-optical recording medium is set such that an amplitude of a reproduced signal from the address bits by the recording spot and an amplitude of a recorded signal from the address bits by the reproducing spot are substantially equal.

26. An information recording and reproducing method according to claim 18 wherein a multi-layer recording film having a number of metal layers and dielectric layers alternately laminated is used.

27. A magneto-optical memory apparatus comprising:
   a motor for movably carrying a magneto-optical recording medium;
   a recording head having an optical system for irradiating a recording spot having a high energy to said magneto-optical recording medium and a magnetic head for applying a magnetic field of a polarity corresponding to information to be recorded to an irradiation area of said recording spot, for recording domains in the recording medium representing the information along a track, each domain having a length extending along the track which is smaller than the size of the irradiated recording spot; and
   a reproducing head having an optical system for irradiating a reproducing spot having a lower energy and a shorter wavelength than the energy and wavelength of the irradiated recording spot along the track to said magneto-optical recording medium, and a magneto-optical signal detection system for detecting a displacement of a polarization plane of a reflected light of the reproducing spot to read out the recorded domains wherein said reproducing head forms the reproducing spot by a laser beam having a wavelength of no longer than 600 nm.

28. A magneto-optical memory apparatus according to claim 27 wherein said recording head forms the recording spot by a laser beam having a wavelength of no shorter than 600 nm.

29. A magneto-optical memory apparatus according to claim 27 wherein said reproducing head forms the reproducing spot by a second harmonics generated by a second harmonics generating element from a laser source.

30. A magneto-optical memory apparatus according to claim 27 wherein a shape of at least one of the recording spot and the reproducing spot extends perpendicularly to the track.

31. A magneto-optical memory apparatus according to claim 27 wherein an optical system is shared by said recording head and said reproducing head, the recording spot and the reproducing spot are irradiated through said optical system, and said recording head includes a control signal detector for detecting a focusing signal and a tracking signal from a reflected light of the recording spot.

32. A magneto-optical memory apparatus according to claim 27 wherein the recording spot and the reproducing spot are irradiated through separate optical system, and said recording head and said reproducing head include detectors for detecting a focusing signal, a tracking signal and a reproduced signal obtained from address bits previously provided in the magneto-optical recording medium from reflected lights of the recording spot and the reproducing spot, respectively.

33. A magneto-optical memory apparatus according to claim 32 wherein a shape of the reproducing spot extends perpendicularly to the track, an optical depth of a guide groove formed in the magneto-optical recording medium is selected such that an amplitude of a tracking signal by the recording spot and an amplitude of a tracking signal by the reproducing spot are substantially equal to permit the following of the guide groove by the recording spot and the reproducing spot.

34. A magneto-optical memory apparatus according to claim 32 wherein the three spots are irradiated through the optical system for irradiating the reproducing spot, a middle spot is used as the reproducing spot and the end spots are used to detect a tracking signal, and an optical depth of a guide groove formed in the magneto-optical recording medium is set such that an amplitude of the tracking signal by the recording spot is substantially maximum.

35. A magneto-optical memory apparatus according to claim 32 wherein an optical depth of pits formed in the magneto-optical recording medium is set such that an amplitude of a reproduced signal from the address bits by the recording spot and an amplitude of a reproducing signal from the address bits by the reproducing spot are substantially equal.

36. A magneto-optical memory apparatus according to claim 27 wherein a multi-layer recording film having a number of metal layers and dielectric layers alternately laminated is used.

37. A magneto-optical memory apparatus according to claim 36 wherein said metal layer includes at least one material layer selected from Pt, Pd, Rh and Au and at least one material layer selected from Co and Fe.

38. A magneto-optical memory apparatus according to claim 36 wherein said metal layer is an alloy layer formed of at least one element selected from Pt, Pd, Rh, Ca and Au and at least one element selected from Co and Fe.

39. A magneto-optical memory apparatus according to claim 36 wherein a light reflection layer is formed on a lowermost or uppermost layer of the multi-layer structure.

40. The apparatus according to claim 27, wherein at least one of said recording spot and said reproducing spot has a shape of a longer diameter along a direction perpendicular to the track and a light intensity distribution of a substantially trapezoidal shape therealong.

41. The apparatus according to claim 27, wherein said reproducing spot has a light intensity distribution of a trapezoidal shape in a direction perpendicular to the track.

42. The apparatus according to claim 27, wherein said reproducing spot has a diameter along the track equal to about a half of a diameter of the recording spot and a diameter along a direction perpendicular to the track which is substantially equal to the diameter of said recording spot.

43. The apparatus according to claim 27, wherein at least one of said recording spot and said reproducing spot has a shape of a longer diameter along a direction perpendicular to the track and a light intensity distribution of a substantially trapezoidal shape therealong.

44. The apparatus according to claim 27, wherein said domain has a crescent shape.

45. The apparatus according to claim 27, wherein the length of said domain is equal to or smaller than a half the diameter of the recording spot.

46. A magneto-optical apparatus comprising:
a motor for movably carrying a magneto-optical recording media;
a recording head having an optical system for irradiating a recording spot having a high energy to said magneto-optical recording medium and a magnetic head for applying magnetic field having a polarity thereof switched in accordance with information to be recorded, to an irradiation area of the recording spot for recording domains representing the information along a track; and
a reproducing head having an optical system for irradiating a reproducing spot having a low energy emitted by a laser beam having a wavelength of no larger than 600 nm to said magneto-optical recording medium and a magneto optical signal detection system for detecting a displacement of a polarization plane of a reflected light of the reproducing spot to read out the recording domains, the reproducing spot having a lower energy and a shorter wavelength than the energy and wavelength of the irradiated recording spot.

47. A magneto-optical memory apparatus according to claim 46 wherein said recording head forms the recording spot by a laser beam having a wavelength of no smaller than 600 nm.

48. A magneto-optical memory apparatus according to claim 46 wherein said reproducing head forms the reproducing spot by a second harmonics generated by a second harmonics generating element from a laser source.

49. A magneto-optical memory apparatus according to claim 46 wherein the recording spot and the reproducing spot are irradiated by separate optical systems, and said recording head and said reproducing head include detectors for detecting a focusing signal, a tracking signal and a reproduced signal obtained from address bits previously provided in the magneto-optical recording medium from selected lights of the recording spot and the reproducing spot, respectively.

50. A magneto-optical memory apparatus according to claim 49 wherein a shape of the reproducing spot extends perpendicularly to the track, an optical depth of a guide groove formed in the magneto-optical recording medium is selected such that an amplitude of a tracking signal by the recording spot and an amplitude of a tracking signal by the reproducing spot are substantially equal to permit the following of the guide groove by the recording spot and the reproducing spot.

51. A magneto-optical memory apparatus according to claim 49 wherein three spots are irradiated through an objective lens for irradiating the reproducing spot, a middle spot is used as the reproducing spot and end spots are used to detect a tracking signal, and an optical depth of a guide groove formed in the magneto-optical recording medium is set such that an amplitude of the tracking signal by the recording spot is substantially maximum.

52. A magneto-optical memory apparatus according to claim 49 wherein an optical depth of pits formed in the magneto-optical recording medium is set such that an amplitude of a reproduced signal from the address bits by the recording spot and an amplitude of a recording signal from the address bits by the reproducing spot are substantially equal.

53. A magneto-optical memory apparatus according to claim 46 wherein a recording film having a multi-layer structure of alternate lamination of a number of metal layers and dielectric layers is used.

* * * * *